United States Patent
V. K. et al.

(10) Patent No.: US 11,496,235 B2
(45) Date of Patent: Nov. 8, 2022

(54) SYMMETRIC PATH/LINK OVER LAG INTERFACE USING LLDP FOR TIME SYNCHRONIZATION BETWEEN TWO NODES USING PTP

(71) Applicant: Juniper Networks, Inc., Sunnyvale, CA (US)

(72) Inventors: Prabhu Raj V. K., Bangalore (IN); Kamatchi Soundaram Gopalakrishnan, Dublin, CA (US); M. Ramana Reddy, Anantapur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/247,881

(22) Filed: Dec. 29, 2020

(65) Prior Publication Data
US 2021/0119718 A1  Apr. 22, 2021

Related U.S. Application Data

(63) Continuation of application No. 15/982,901, filed on May 17, 2018, now Pat. No. 10,887,037.

(51) Int. Cl.
*H04L 45/24* (2022.01)
*H04J 3/06* (2006.01)
(Continued)

(52) U.S. Cl.
CPC .......... *H04J 3/0667* (2013.01); *H04J 3/0673* (2013.01); *H04L 41/12* (2013.01); *H04L 45/245* (2013.01); *H04L 47/24* (2013.01)

(58) Field of Classification Search
CPC ..... H04L 12/24; H04L 12/709; H04L 12/851; H04L 41/12; H04L 45/245; H04L 47/24; H01L 33/502
See application file for complete search history.

(56) References Cited

U.S. PATENT DOCUMENTS 10,887,037 B2    1/2021  V. K. et al.
2004/0257995 A1*  12/2004  Sandy ................ H04L 47/2441
                                          370/396
(Continued)

FOREIGN PATENT DOCUMENTS

CN    103780500 A    5/2014
CN    103916950 A    7/2014
(Continued)

OTHER PUBLICATIONS

Extended European Search Report for Application No. EP19164816.1, dated Oct. 4, 2019, 8 pages.
(Continued)

*Primary Examiner* — Anez C Ebrahim
(74) *Attorney, Agent, or Firm* — Harrity & Harrity, LLP

(57) ABSTRACT

A network device may assign, to a port of a plurality of ports on the network device, a precision timing protocol (PTP) port priority for PTP communications between the network device and another network device. The network device and the other network device may be communicatively connected via a plurality of links in a link aggregation group (LAG). Each port, of the plurality of ports, may be associated with a respective link, of the plurality of links, in the LAG. The network device may generate a link layer discovery protocol (LLDP) frame that includes information identifying the PTP port priority assigned to the port. The network device may transmit the LLDP frame to the other network device to identify, to the other network device, the PTP port priority.

20 Claims, 15 Drawing Sheets

(51) Int. Cl.
*H04L 41/12* (2022.01)
*H04L 47/24* (2022.01)

(56) References Cited

U.S. PATENT DOCUMENTS

| | | | |
|---|---|---|---|
| 2008/0247395 A1* | 10/2008 | Hazard | H04L 45/00 370/392 |
| 2009/0316707 A1 | 12/2009 | Hawley et al. | |
| 2010/0182920 A1* | 7/2010 | Matsuoka | H04L 43/00 370/252 |
| 2012/0275301 A1 | 11/2012 | Xiong | |
| 2013/0064102 A1* | 3/2013 | Chang | H04L 49/552 370/255 |
| 2013/0301634 A1* | 11/2013 | Ehlers | H04L 12/4625 370/350 |
| 2013/0336117 A1 | 12/2013 | Yan et al. | |
| 2014/0025736 A1* | 1/2014 | Wang | H04L 45/245 709/204 |
| 2014/0211612 A1 | 7/2014 | Dutti et al. | |
| 2015/0271088 A1 | 9/2015 | Ao | |
| 2016/0013876 A1 | 1/2016 | Zhang et al. | |
| 2016/0105306 A1* | 4/2016 | Wu | H04L 45/245 370/221 |
| 2016/0173216 A1 | 6/2016 | Yang et al. | |

FOREIGN PATENT DOCUMENTS

| | | |
|---|---|---|
| CN | 104488238 A | 4/2015 |
| EP | 2701342 A1 | 2/2014 |
| WO | 2015003359 A1 | 1/2015 |

OTHER PUBLICATIONS

Extended European Search Report for Application No. EP22159590.3, dated Jun. 22, 2022, 8 pages.

* cited by examiner

SYMMETRIC PATH/LINK OVER LAG INTERFACE USING LLDP FOR TIME SYNCHRONIZATION BETWEEN TWO NODES USING PTP

RELATED APPLICATION

This application is a continuation of U.S. patent application Ser. No. 15/982,901, filed May 17, 2018 (now U.S. Pat. No. 10,887,037), which is incorporated herein by reference.

BACKGROUND

Precision timing protocol (PTP) may be used to synchronize clocks associated with network devices in a network. When used, PTP may be capable of achieving sub-microsecond clock accuracy.

SUMMARY

According to some implementations, a device may include one or more memories, and one or more processors to assign, to a port of a plurality of ports on the network device, a PTP port priority for PTP communications between the network device and another network device. The network device and the other network device may be communicatively connected via a plurality of links in a link aggregation group (LAG). Each port, of the plurality of ports, may be associated with a respective link, of the plurality of links, in the LAG. The one or more processors may generate a link layer discovery protocol (LLDP) frame. The LLDP frame may include information identifying the PTP port priority, assigned to the port, for the PTP communications between the network device and the other network device. The one or more processors may transmit the LLDP frame to the other network device to identify, to the other network device, the PTP port priority.

According to some implementations, a non-transitory computer-readable medium may store instructions that include one or more instructions that, when executed by one or more processors, cause the one or more processors to determine, for a plurality of ports on a first network device, a PTP port priority order for PTP communications between the first network device and a second network device. The first network device and the second network device may be communicatively connected via a plurality of links in a LAG. Each port, of the plurality of ports, is associated with a respective link, of the plurality of links, in the LAG. The one or more instructions may cause the one or more processors to assign, based on the PTP port priority order, a respective PTP port priority to each port of the plurality of ports. The one or more instructions may cause the one or more processors to, for each port of the plurality of ports, generate a respective LLDP frame and transmit the respective LLDP frame to the second network device. The respective LLDP frame, for a port of the plurality of ports, may include information identifying the respective PTP port priority assigned to the port.

According to some implementations, a method may include receiving, at a port of a plurality of ports on a first network device, a LLDP frame from a second network device. The first network device and the second network device may be communicatively connected via a plurality of links in a LAG. The port may be associated with a link of the plurality of links in the LAG. The method may include identifying, by the first network device, PTP information included in the LLDP frame. The method may include determining, by the first network device and based on the PTP information included in the LLDP frame, a PTP port priority for PTP communications between the first network device and the second network device. The method may include assigning, by the first network device, the PTP port priority to the port. The method may include performing, by the first network device and based on the PTP port priority assigned to the port, the PTP communications between the first network device and the second network device.

DETAILED DESCRIPTION

Figure 1A:
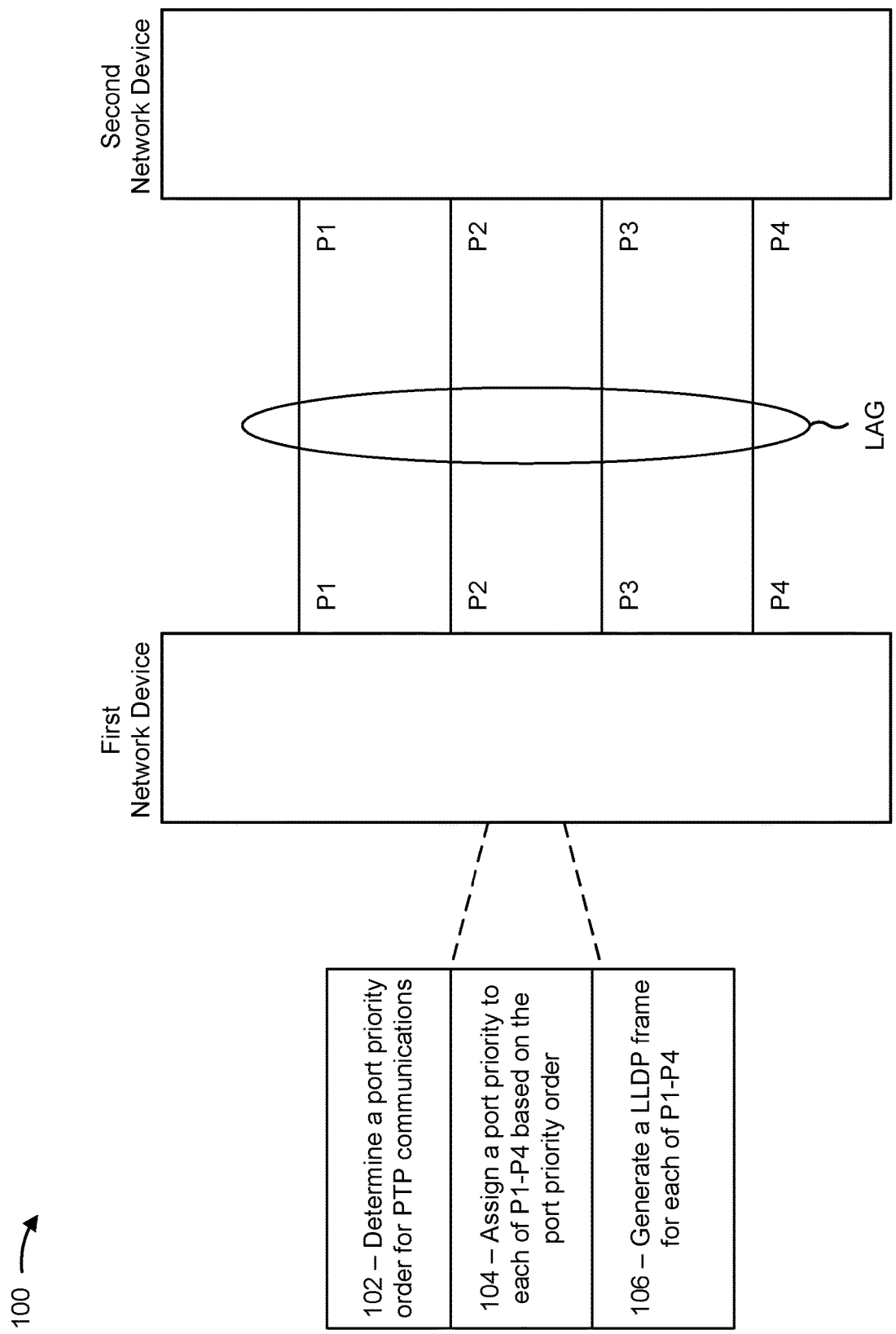
FIGS. 1A-1H are diagrams of an example implementation described herein.

The following detailed description of example implementations refers to the accompanying drawings. The same reference numbers in different drawings may identify the same or similar elements.

In some networks, a first network device and a second network device may perform PTP communications. PTP communications may include an exchange of various types of PTP packets to synchronize a clock associated with the first network device and a clock associated with the second network device, and to maintain the synchronization.

To initiate PTP communications, the clock associated with the first network device or the clock associated with the second network device may be selected as a master (e.g., using techniques such as the best master clock algorithm and/or the like) and the other may be selected as a slave. For example, the clock associated with the first network device may be selected as the master and the clock associated with the second network device may be selected as the slave. Accordingly, the clock associated with the second network device may synchronize to the clock associated with the first network device.

To initiate clock synchronization using PTP, the first network device may transmit a synchronization packet (at time T1) to the second network device (received at time T2). The second network device may receive the synchronization packet and determine the time offset from first device plus propagation delay between the first network device and the second network device by subtracting T2−T1 time-stamps. (i.e., a time it takes for a packet to propagate from the first network device to the second network device or from the second network device to the first network device) based on receiving the synchronization packet. In order to adjust local time to match with the first device, the second device needs to find out only time-offset from first device, for that it has to find out what is the propagation delay alone.

To determine the propagation delay, the second network device may respond to the synchronization packet by transmitting a delay request packet (at time T3) to the first network device (received at time T4). The first network device may respond to the delay request packet by transmitting a delay response packet (with time T4) to the second network device. The second network device on receiving delay response packet with timestamp T4, it can find the time-offset plus reverse delay by subtracting T4−T3 timestamps.

To find the actual time-offset from first device, the second device finds the difference of forward offset plus forward propagation delay with reverse offset plus reverse propagation delay. The net will be two times offset and forward and reverse propagation delay gets cancelled out. The high precision of actual time offset achieved only when forward and reverse propagation delays are same. To achieve same propagation delay the symmetric path/link shall be used for all PTP synchronization packets exchange between first node and second node.

In some implementations, the first network device may be connected with the second network device over a plurality of links. For example, the first network device and the second network device may each have two ports, port P1 and port P2, and may be connected over two links, link P1-P1 and link P2-P2. The plurality of links may be aggregated into a link aggregation group (LAG) to increase throughput (e.g., by allowing data to be transmitted simultaneously over the plurality of links), provide redundancy (e.g., data may be transmitted over a primary link and switched over to a secondary link if a fault in the primary link occurs), increase reliability (e.g., by balancing traffic on the plurality of links), and/or the like.

The first network device and the second network device may be configured to perform PTP communications over the LAG. For example, the first network device and the second network device may each be configured (e.g., by a user such as a network administrator, a network operator, and/or the like) to perform the PTP communications using a primary port, and to switch over to a secondary port if a link associated with the primary port experiences a fault. However, since the first network device and the second network device are configured independently (i.e., the first network device is configured without regard to the configuration of the second network device, and vice-versa), there is no guarantee that ports, associated with a same link, on each network device will be selected as primary ports. For example, port P1 on the first network device may be selected as the primary port of the first network device and port P2 on the second network device may selected as the primary port on the second network device. As a result, the first network device may transmit PTP communications on link P1-P1, while the second network device may transmit PTP communications on link P2-P2.

This can cause clock synchronization errors because link P1-P1 may have a different propagation delay than link P2-P2. This can occur, for example, where link P1-P1 and link P2-P2 are cables that have different physical lengths. In some cases, the propagation delay for a cable, such as an optical fiber cable, may be around 4 ns for every 1 meter of cable length. Accordingly, if link P1-P1 is an optical fiber cable having a length of 10,000 meters, and link P2-P2 is an optical fiber cable having a length of 10,100 meters (a 1% difference in length), the difference in propagation delay between link P1-P1 and link P2-P2 may be estimated as around 400 ns. Since the round-trip time calculation above assumes that the propagation delay from the first network device to the second network device and the propagation delay from the second network device to the first network device is the same or substantially similar, the asymmetric propagation delay between link P1-P1 and link P2-P2 will result in erroneous calculations. This may cause the second network device to move out of phase and/or out of frequency synchronization relative to the first network device, which may result in users of the network experiencing issues, such as dropped calls, interruptions in data streaming, loss of connections to application servers, and/or the like.

Asynchronous propagation delay and independent configurations of the first network device and the second network device, as described above, may also impact clock synchronization when the first network device and/or the second network device switch over to a secondary port for PTP communications, such as when on a fault occurs in a link in the LAG. For example, the first network device and the second network device may each have three ports (e.g., ports P1, P2, and P3 respectively associated with link P1-P1, link P2-P2, and link P3-P3), and the first network device may be configured with a port priority order (e.g., P1, P2, P3) that differs from a port priority order for the second network device (e.g., P1, P3, P2). Accordingly, when a fault occurs in link P1-P1, the first network device will switch over to port P2, whereas the second network device will switch over to port P3. As a result, the second network device will move out of phase and/or out of frequency synchronization relative to the first network device if link P2-P2 and link P3-P3 have different propagation delays.

Some implementations described herein provide a network device that is capable of automatically self-configuring a port priority order using LLDP. The network device may determine, for a plurality of ports on the network device, a port priority order for PTP communications between the network device and another network device. The network device and the other network device may be communicatively connected via a plurality of links in a LAG. Each port, of the plurality of ports on the network device, may be associated with a respective link, of the plurality of links, in the LAG. The network device may assign, based on the port priority order, a respective port priority to each port of the plurality of ports. For each port of the plurality of ports, the network device may generate a respective LLDP frame for a port of the plurality of ports, and transmit the respective LLDP frame to the second network device. The respective LLDP frame may include information identifying the respective port priority assigned to the port.

In this way, the network device can assign a port priority to each port on the network device, and communicate the port priority for each port to the other network device. This allows the other network device to configure a port priority order for a plurality of ports on the other network device such that the port priority order for the plurality of ports on the network device matches the port priority order for the plurality of ports on the other network device. To do so, the other network device may receive, at a port of a plurality of ports on the other network device, a LLDP frame from the network device. The other network device may identify PTP information included in the LLDP frame, determine a port priority based on the PTP information, and assign the port priority to the port.

In this way, the network device and the other network device may select ports associated with a same link to perform PTP communications, thereby avoiding asynchronous propagation delay and ensuring an accurate propagation delay calculation. Moreover, the network device and the other network device may dynamically switch over to subsequent ports in a coordinated manner. This ensures that a clock associated with the network device and a clock associated with the other network device remain in synchronization if a fault occurs in a link in the LAG.

FIGS. 1A-1H are diagrams of an example implementation 100 described herein. As shown in FIGS. 1A-1H, example implementation 100 may include a first network device and a second network device. As shown in FIGS. 1A-1H, the first network device and the second network device may each have four ports, ports P1-P4. Port P1 of the first network device may be connected to port P1 of the second network device to form a link P1-P1, port P2 of the first network device may be connected to port P2 of the second network device to form a link P2-P2, and so on. Links P1-P1 through P4-P4 may be aggregated into a LAG, and may be implemented by optical fiber cables, copper cables, wireless links, and/or the like.

While the description with regard to FIGS. 1A-1H will describe the first network device and the second network device as both having four ports, in practice, the first network device and the second network device may have additional or fewer ports and/or may have an unequal number of ports (e.g., the first network device may have a greater number of ports than the second network device, or vice versa). Also, while the description with regard to FIGS. 1A-1H will describe that port P1 is connected to port P1, port P2 is connected to port P2, and so on, in practice, any port of the first network device may be connected to any port of the second network device.

The first network device and the second network device may include various types of network devices, such as a firewall, a router, a gateway, a switch, a hub, a bridge, a wireless access point, a base station (e.g., eNodeB, NodeB, gNodeB, and/or the like), a grandmaster clock device, a boundary clock device, and/or the like.

The first network device and the second network device may be included in a wired and/or wireless network, such as cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like. For example, the first network device and the second network device may be included in an edge of the network, in a backhaul of the network, in a core of the network, and/or the like.

The first network device and the second network device may each be associated with a clock. The clock associated with the first network device and the clock associated with the second network device may be used to synchronize communications between the first network device and the second network device. The clocks may be various types of clocks, such as a grandmaster clock, a boundary clock, an ordinary clock, a transparent clock, and/or the like.

A grandmaster clock may be a clock that functions as the primary source of time to which other clocks in the network are synchronized. The grandmaster clock may obtain a reference time from a global positing system (GPS) signal, an atomic clock signal (e.g., a rubidium atomic clock, a caesium atomic lock, a hydrogen atomic clock, and/or the like), a clock server in the network, and/or the like, and may provide the reference time to other clocks in the network. A boundary clock may be a clock that directly connects to a plurality of other clocks in the network. An ordinary clock may be a clock that directly connects to one other clock in the network. A transparent clock may be a clock capable for forwarding PTP communications.

Grandmaster clocks, boundary clocks, and ordinary clocks can generate and terminate PTP communications, whereas transparent clocks can only forward PTP communications. When forwarding a PTP packet as part of PTP communications, a transparent clock may include information in the PTP packet indicating an amount of time the PTP packet spent at a network device associated with the transparent clock (i.e., an amount of time between a time the network device received the PTP packet and a time the network device transmitted the PTP packet).

In some implementations, when performing PTP communications, the clock associated with the first network device and the clock associated with the second network device may follow a master-slave architecture. For example, the clock associated with the first network device may be a master and the clock associated with the second network device may be a slave. Accordingly, the clock associated with the second network device may synchronize to the clock associated with the first network device. In some implementations, the clock associated with the first network device and/or the clock associated with the second network device may be a master as well as a slave. For example, the clock associated with the first network device may be a boundary clock, and may be connected to a grandmaster clock or another boundary clock upstream in the network as well as a further boundary clock or an ordinary clock downstream in the network. Therefore, the clock associated with the first network device may be a slave to the upstream grandmaster clock or other boundary clock, and may be a master to the downstream further boundary clock or ordinary clock.

Turning now to FIG. 1A, it is assumed that the clock associated with the first network device is a master relative to the clock associated with the second network device and the clock associated with the second network device is a slave relative to the clock associated with the first network device. As shown by reference 102, the first network device may establish a port priority order, for ports P1-P4 on the first network device, for PTP communications with the second network device via the LAG. The port priority order may define an order in which ports P1-P4 on the first network device are to be used for the PTP communications. For example, the first network device may select a first port of ports P1-P4 as the primary port for the PTP communications, a second port of ports P1-P4 as a secondary port for the PTP communications (i.e., a port that will be used for the PTP communications if there is a fault in the link associated with the primary port), a third port of ports P1-P4 as a tertiary port for the PTP communications (i.e., a port that will be used for the PTP communications if there is a fault in the links associated with both the primary port and the secondary port), and so on. An example port priority order may be P1-P3-P2-P4. The first network device may store the port priority order in a data store on the first network device.

The first network device may determine the port priority order based on various factors, such as a respective bandwidth (e.g., a maximum or average rate of data transfer) associated with each link of links P1-P1 through P4-P4, a respective latency (e.g., one-way or round-trip latency) associated with each link of links P1-P1 through P4-P4, a respective port identifier associated with each link of links P1-P1 through P4-P4 (e.g., the first network device may determine the port priority order to be based on an ascending or descending order of port identifiers associated with ports P1-P4 on the first network device), a respective measure of reliability associated with each link of links P1-P1 through P4-P4, and/or the like. In some implementations, the first network device may determine the port priority order for ports, of ports P1-P4 on the first network device, that are associated with active links, of links P1-P1 through P4-P4, and may disregard ports, of ports P1-P4 on the first network device, that are associated with inactive links, of links P1-P1 through P4-P4. A link may be considered inactive if a fault has occurred on the link, if the link has been disabled, and/or the like.

As shown by reference number 104, the first network device may assign a respective port priority to each port of ports P1-P4 on the first network device. In some implementations, the first network device may assign the respective port priorities based on the port priority order. For example, the first network device may determine the port priority order to be P1-P3-P2-P4, as explained above, and may therefore assign port priority 1 to port P1, port priority 2 to port P3, port priority 3 to port P2, and port priority 4 to port P4. Accordingly, port P1 may have a higher priority relative to port P3, port P2, and port P4; port P3 may have a higher priority relative to port P2 and port P4, and a lower priority relative to port P1; and so on. The first network device may store the respective port priority assigned to each port of ports P1-P4 in a data store on the first network device.

As shown by reference number 106, the first network device may generate a respective LLDP frame for each port of ports P1-P4 on the first network device. LLDP is a link layer protocol that may be used by the first network device to provide, to the second network device (and vice-versa), information associated with an identity of the first network device, one or more capabilities of the first network device, one or more configurations of the first network device, and/or the like. The information may be transmitted in a LLDP frame, which may be a type of Ethernet frame having an Ethertype corresponding to LLDP. An example of a LLDP frame is described below in reference to FIGS. 2A and 2B.

The respective LLDP frame for a port (e.g., port P1) of ports P1-P4 on the first network device may include various fields, such as a source address field (e.g., a field including information associated with an address of the first network device), a destination address field (e.g., a field including information associated with an address of the second network device), an Ethertype field (e.g., a field including information indicating that the respective LLDP frame is a LLDP frame type), one or more type-length-value (TLV) fields (e.g., one or more fields that include information encoded in a TLV scheme, as described below), and/or the like.

The first network device may include, in a TLV field in the respective LLDP frame, information identifying the port priority assigned to the port. The TLV field may include a type subfield, a length subfield, and a value subfield. The type subfield may include information indicating a type of the TLV field. The TLV field type may be an optional TLV, such as a reserved TLV type, a custom TLV type, and/or the like. A reserved TLV may be an unused TLV that has not yet been implemented for standardization and/or a specific use. Accordingly, a reserved TLV may be configured and/or standardized for PTP communications. A custom TLV may be a vendor-specific TLV that allows different vendors to define new types of information so that, for example, new capabilities can be advertised using LLDP. In some implementations, a port identifier TLV type may be used to transmit PTP information.

The length subfield may include information identifying a length of the value subfield. The value subfield may include various types of PTP information, such as information identifying a PTP information type, information identifying a PTP information value, and/or the like. The PTP information type may include information indicating a type of PTP information included in the PTP information value. For example, the PTP information type may be type 1, thereby indicating that the PTP information value is a port priority value. The PTP information value may, therefore, be the port priority assigned to the port.

Figure 1B:
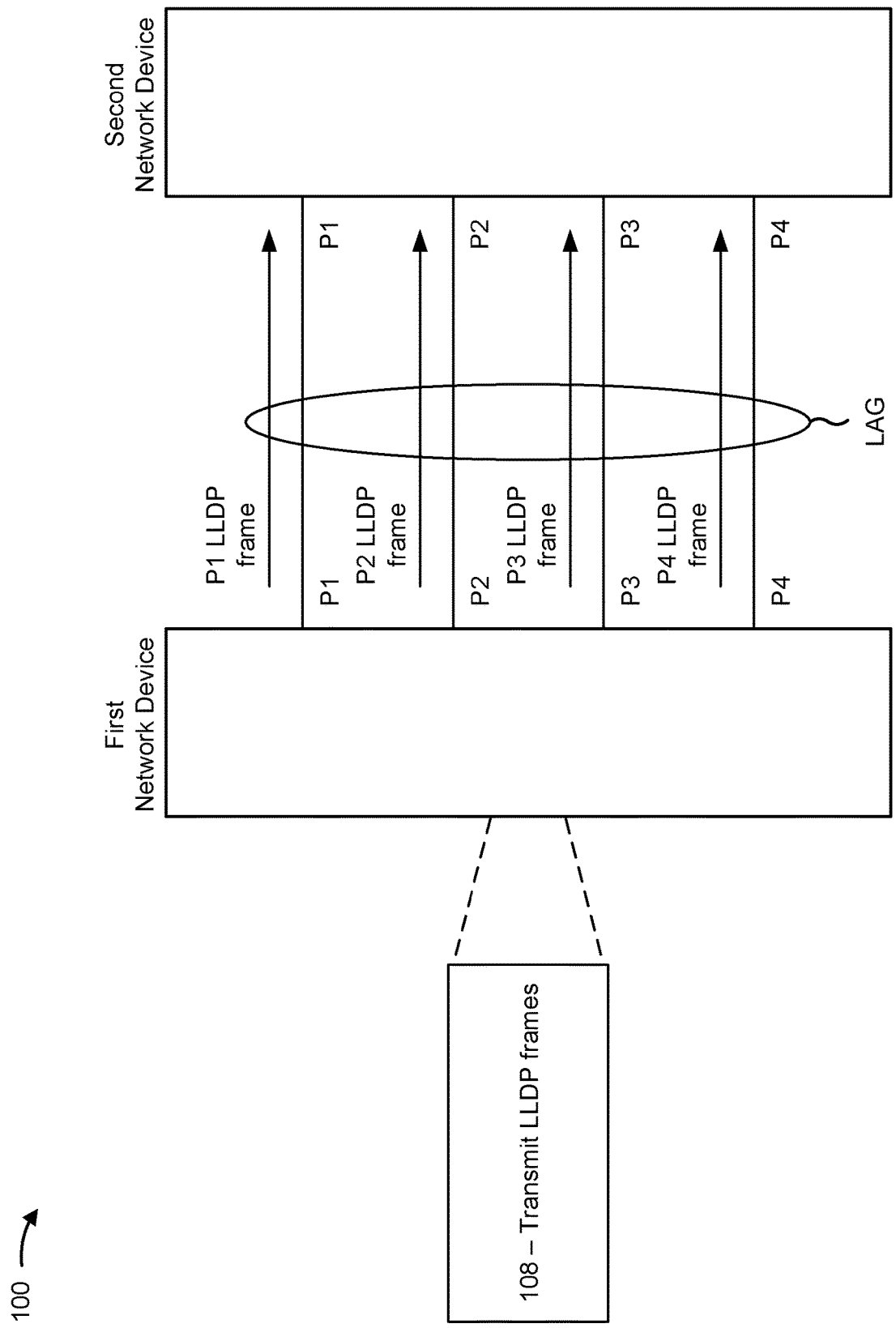

As shown in FIG. 1B, and by reference number 108, the first network device may transmit the respective LLDP frame for each port, of ports P1-P4 on the first network device, to the second network device. For example, the respective LLDP frame for port P1 on the first network device may be transmitted to the second network device via link P1-P1, the respective LLDP frame for port P2 on the first network device may be transmitted to the second network device via link P2-P2, and so on.

In this way, the first network device may automatically self-configure a port priority order for PTP communications between the first network device and the second network device, and may assign a respective port priority to each port of ports P1-P4 on the first network device. Due to the complexity of manually configuring switchover logic for PTP communications over a LAG, some users may only configure a subset of ports available on a network device. In this way, all ports (or at least a larger quantity of ports) on a network device may be automatically self-configured by the network device, which provides greater redundancy, which in turn provides greater reliability in PTP communications.

As explained above, it is assumed that the clock associated with the second network device may be a slave to the clock on the first network device. Accordingly, the second network device may configure port priorities for ports P1-P4 on the second network device based on the port priorities assigned to ports P1-P4 on the first network device to ensure symmetric PTP communications (i.e., to ensure that the first network device and the second network device perform PTP communications on the same link of the LAG).

Figure 1C:
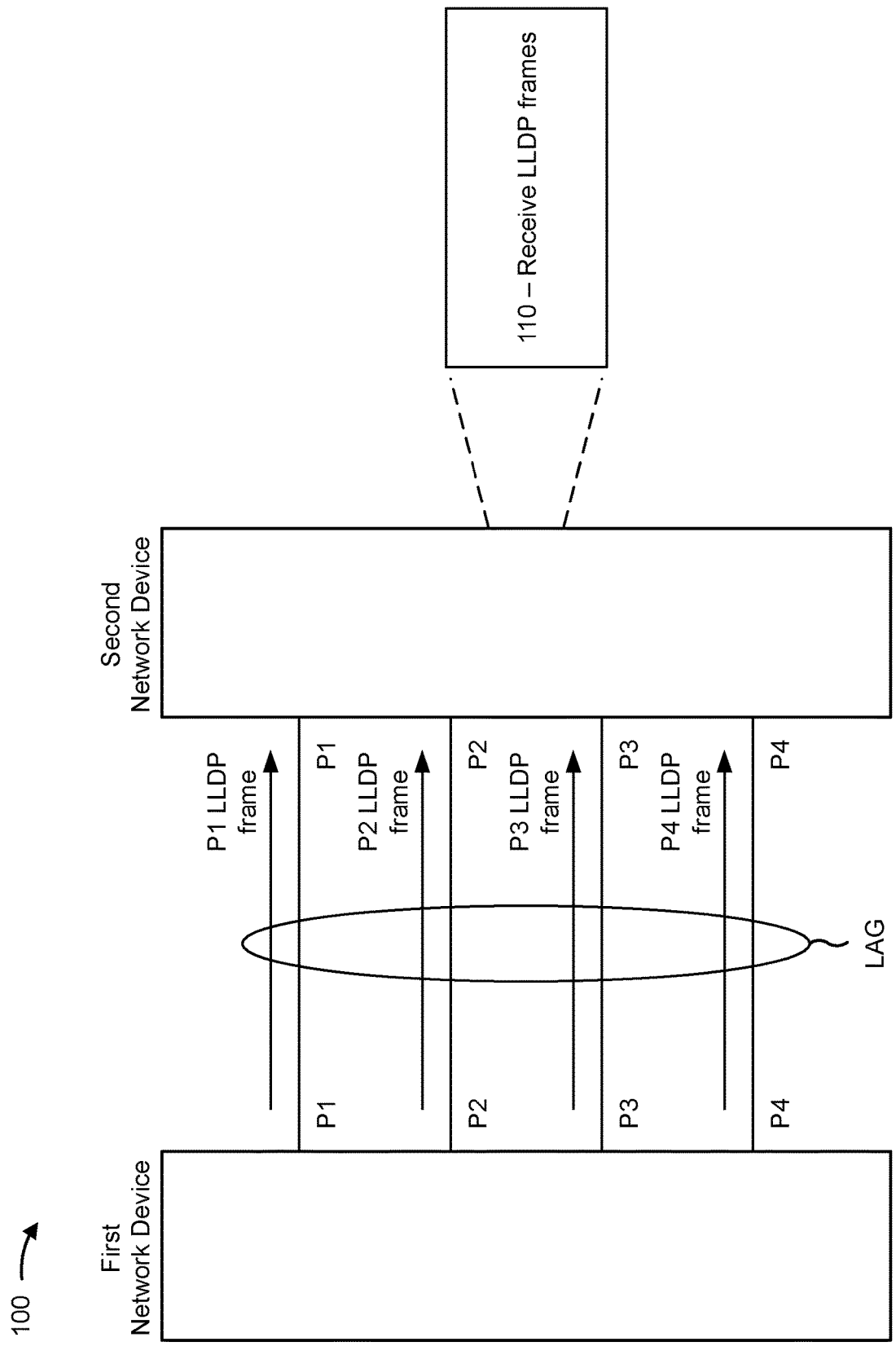

Turning now to FIG. 1C, and as shown by reference number 110, the second network device may receive the LLDP frames transmitted by the first network device. Each port of ports P1-P4 may receive a LLDP frame on the respective link, in the LAG, associated with the port. For example, port P1 on the second network device may receive a LLDP frame on link P1-P1, port P2 on the second network device may receive a LLDP frame on link P2-P2, and so on.

Figure 1D:
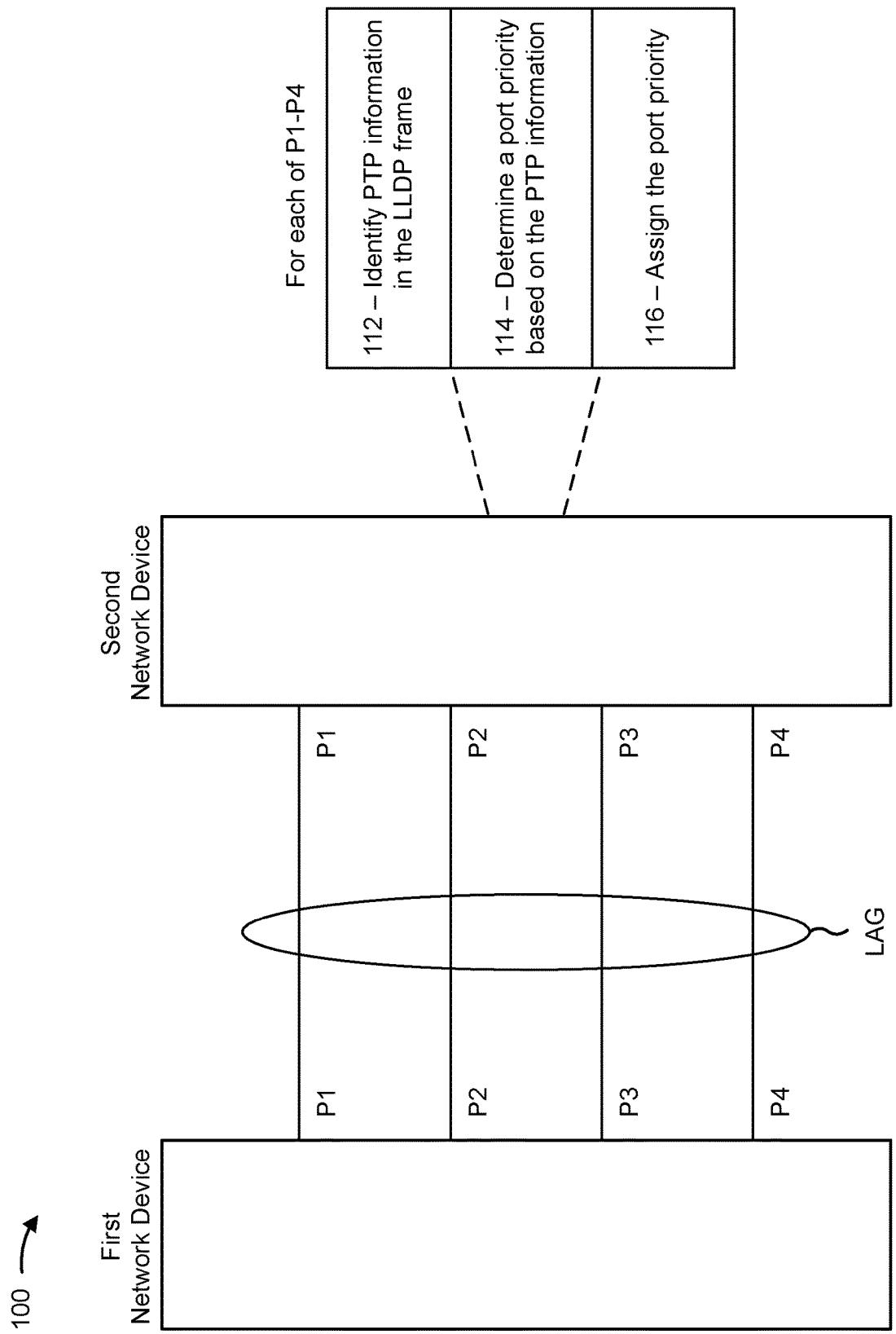

As shown in FIG. 1D, the second network device may perform a process, shown by reference numbers 112-116, to assign a port priority to each port of ports P1-P4 on the second network device. Accordingly, the process will be described in reference to port P1 on the second network device, and can be applied similarly to ports P2-P4 on the second network device.

As shown to by reference number 112, the second network device may examine the respective LLDP frame received at port P1 of the second network device to identify PTP information included in the respective LLDP frame. As explained above, a LLDP frame may include PTP information in a TLV field. Accordingly, the second network device may identify the PTP information in the respective LLDP frame by examining one or more TLV fields in the respective LLDP frame.

As shown in reference number 114, the second network device may determine, based on the PTP information included in the respective LLDP frame, a port priority for PTP communications between the second network device and the first network device. As explained above, the PTP information included in a LLDP frame may include information such as information identifying a PTP information type, information identifying a PTP information value, and/ or the like. Accordingly, the second network device may examine the PTP information type to determine the type of the PTP information value included in the respective LLDP frame. In this instance, the second network device may determine that the PTP information type in the LLDP frame is a particular type (e.g., type 1), which may indicate that the PTP information value is a port priority value. Accordingly, the second network device may determine the port priority based on the PTP information value in the respective LLDP frame. In this instance, since the first network device assigned port priority 1 to port P1 on the first network device, and port P1 on the first network device is connected to port P1 on the second network device via link P1-P1, the PTP information value in the respective LLDP frame may include information indicating a port priority of port priority 1.

As shown by reference number 116, the second network device may assign a port priority to port P1 on the second network device based on the port priority determined from the PTP information included in the respective LLDP frame. In this instance, the second network device determined a port priority of port priority 1 from the PTP information included in the respective LLDP frame. Accordingly, the second network device may assign port priority 1 to port P1 on the second network device.

As explained above, the process illustrated by reference numbers 112-116 may be repeated (e.g., performed sequentially or concurrently) for ports P2-P4 on the second network device. The resulting port priorities on the second network device may be P1—priority 1, P3—priority 2, P2,—priority 3, and P4—priority 4.

Figure 1E:
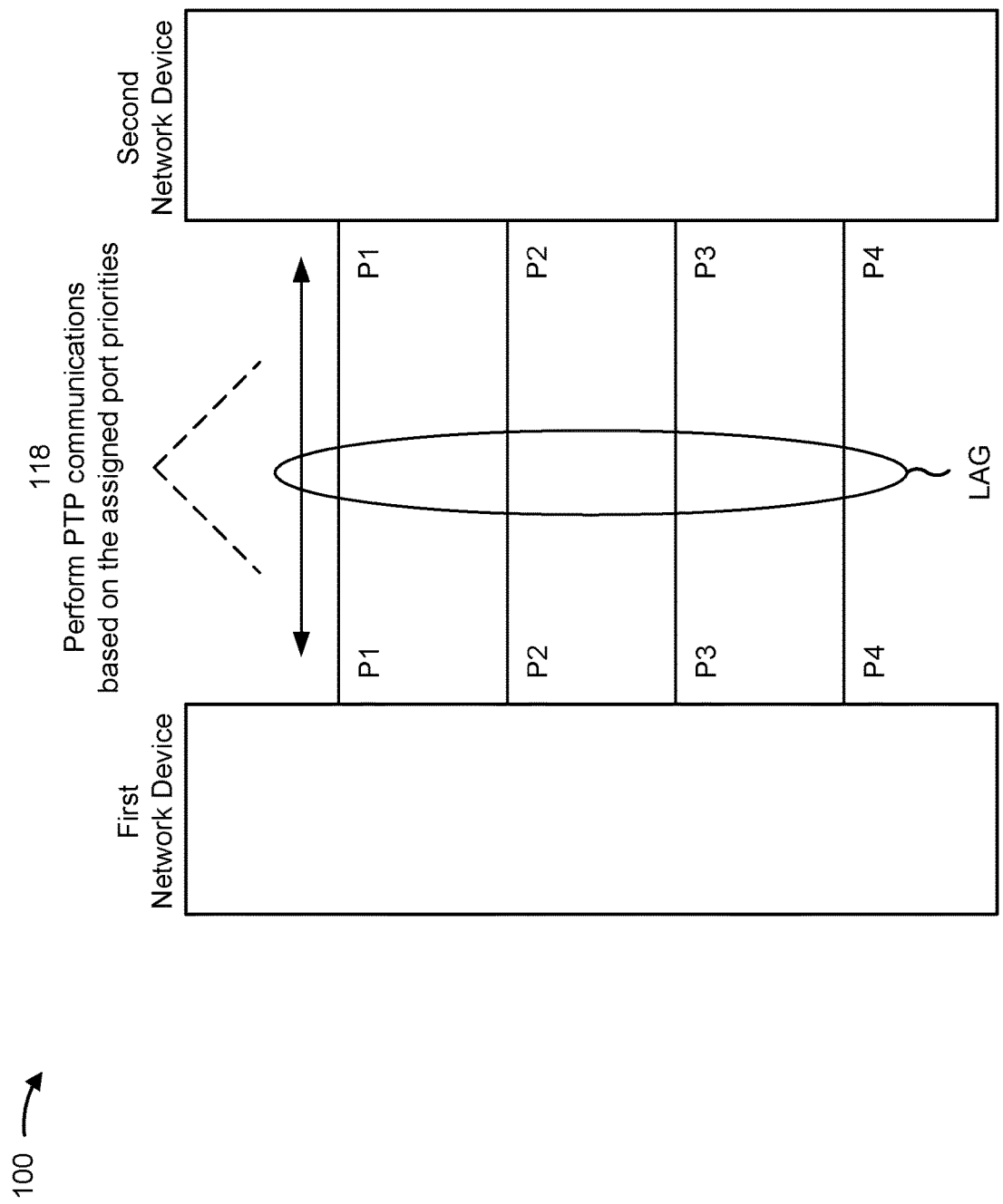

As shown in FIG. 1E, and by reference block 118, the first network device and the second network device may perform PTP communications based on the port priorities assigned to ports P1-P4 on the first network device and the port priorities assigned to ports P1-P4 on the second network device. As shown in FIG. 1E, the first network device selects port P1 on the first network device to perform the PTP communications based on port P1 on the first network device being assigned port priority 1. Similarly, the second network device selects port P1 on the second network device to perform the PTP communications based on port P1 on the second network device being assigned port priority 1.

In this way, the second network device may automatically self-configure port priorities for ports P1-P4 on the second network device based on the port priorities assigned to ports P1-P4 on the first network device. This ensures that ports on the first network device and ports on the second network device sharing a same link in the LAG are assigned a same port priority. This prevents asynchronous propagation delay between the first network device and the second network device, which ensures an accurate propagation delay calculation when the clock on the second network device synchronizes to the clock on the first network device.

Moreover, the first network device and the second network device may dynamically switch over to subsequent ports in a coordinated manner. This ensures that a clock associated with the first network device and a clock associated with the second network device remain in synchronization if a fault occurs in a link in the LAG.

Figure 1F:
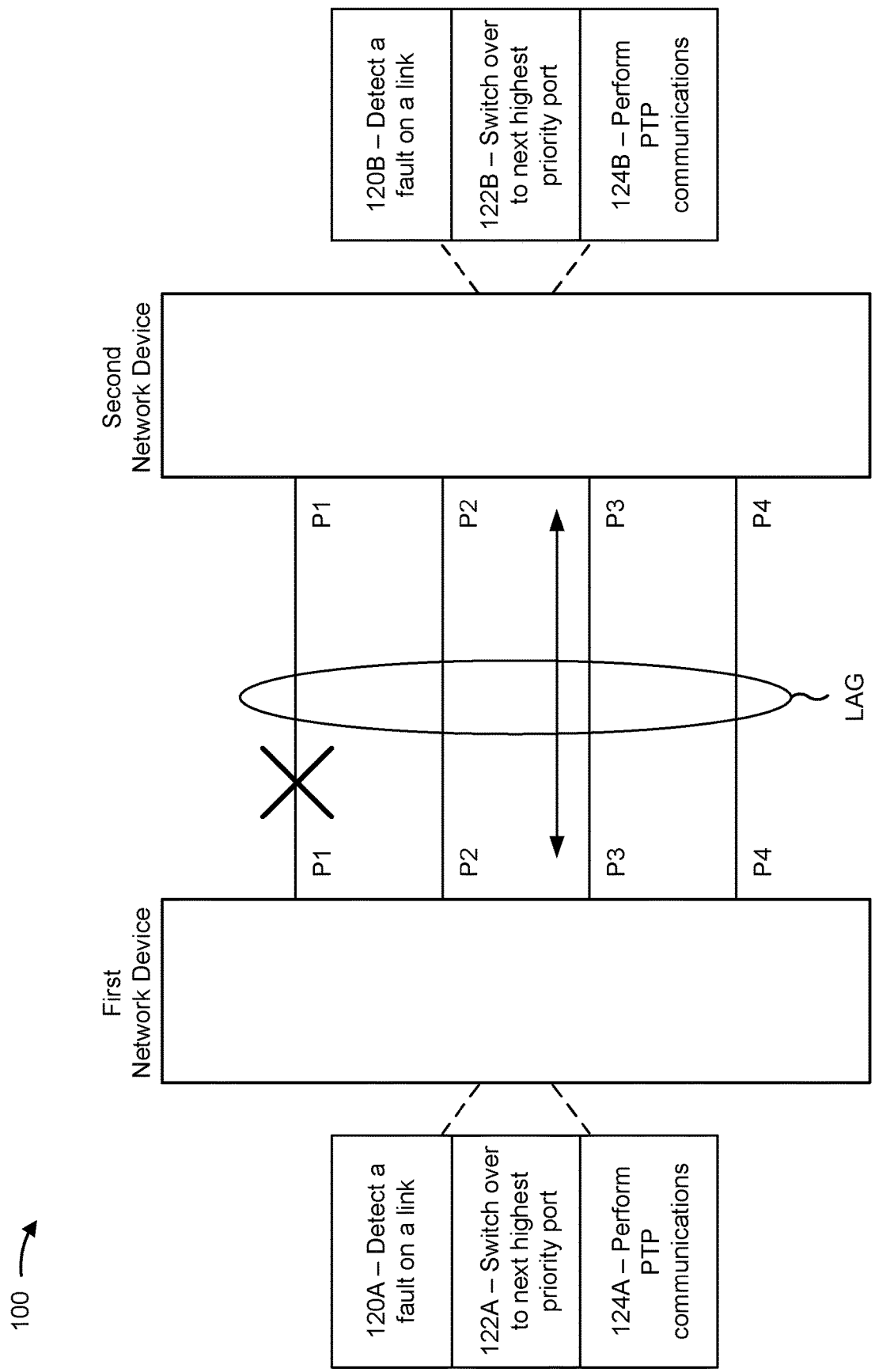

For example, as shown in FIG. 1F, a fault may occur on link P1-P1, which may be associated with port P1 on the first network device and port P1 on the second network device. In this instance, port P1 on the first network device may be assigned port priority 1 on the first network device, and port P1 on the second network device may be assigned port priority 1 on the second network device, as explained above. Since the fault occurred on the link associated with the port on the first network device assigned port priority 1, the first network device may perform a process, shown by reference blocks 120A-124A, to switch over to another port on the first network device to perform the PTP communications. Similarly, since the fault occurred on the link associated with the port on the second network device assigned port priority 1, the second network device may perform a process, shown by reference blocks 120B-124B, to switch over to another port on the second network device to perform the PTP communications. In some implementations, the processes performed by the first network device and the second network device may be independent processes in that the actions performed at reference blocks 120A-124A may be performed separately from, and without knowledge of, the actions performed at reference blocks 120B-124B, and vice-versa.

As shown by reference block 120A, the first network device may detect the fault on link P1-P1. The first network device may detect the fault based on, for example, the first network device determining that a number of packets dropped or lost on link P1-P1 satisfies a threshold number of packets, the first network device using a bidirectional forwarding detection (BFD) protocol (e.g., the first network device determines that a number of Hello packets received at the first network device does not satisfy a threshold number of Hello packets), and/or the like.

As shown by reference block 122A, the first network device may switch over to the next highest priority port on the first network device based on detecting the fault on link P1-P1. For example, the first network device may identify a port of ports P2-P4 on the first network device assigned port priority 2. In this case, the first network device may identify that, as explained above, port priority 2 is assigned to port P3 on the first network device. Accordingly, the first network device may switch over to port P3. As shown by reference block 124A, the first network device, after switching over to port P3, may perform the PTP communications on link P3-P3 via port P3.

As shown by reference blocks 120B-124B, the second network device may switch PTP communications over to port P3 on the second network device in a similar manner to the process described above. In this way, the first network device and the second network device perform PTP communications on the same link of the LAG even if a fault occurs on a link in the LAG.

Figure 1G:
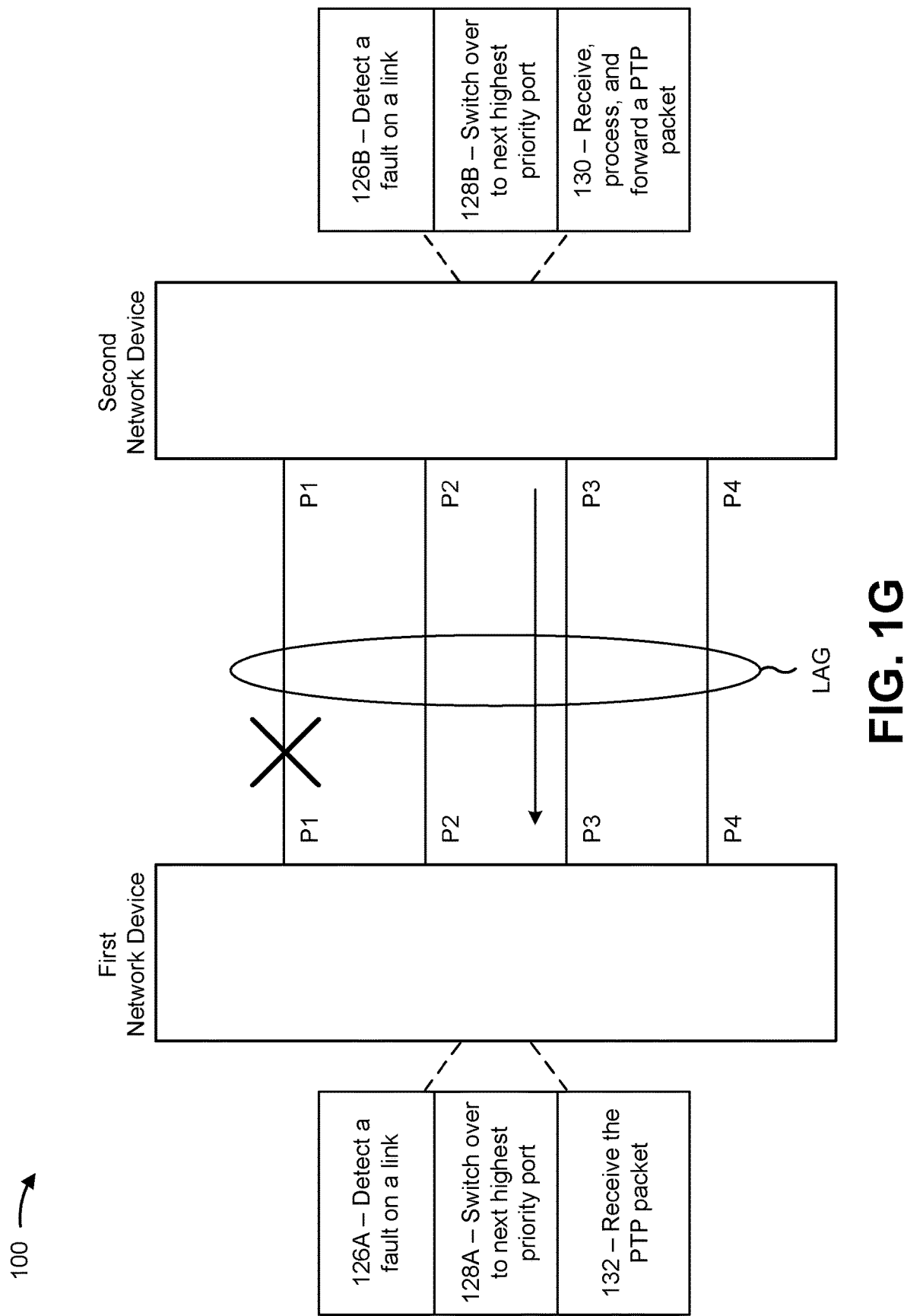

Another example of switchover synchronization is shown in FIG. 1G. In FIG. 1G, the second network device may be associated with a transparent clock (e.g., a PTP clock that does not generate or terminate PTP packets). The transparent clock associated with the second network device in FIG. 1G may receive a PTP packet (e.g., form a third network device) and perform processing on the received PTP packet. The processing may include adding information in the PTP packet that identifies an amount of time the PTP packet spent at the second network device. In this way, the first network device may use the information identifying the amount of time the PTP packet spent at the second network device to synchronize PTP communications with the third network device.

In some implementations, the first network device and the second network device may configure PTP port priorities, as described above in connection with reference numbers 102-

116. For example, the first network device may configure a respective port priority for each of ports P1-P4 on the first network device, transmit a respective LLDP frame from each of ports P1-P4, and the second network device may configure port priorities for ports P1-P4 on the second network device based on the received LLDP frames.

As shown by reference numbers 126A and 126B, the first network device and the second network device may each detect a fault on a link between the first network device and the second network device (e.g., link P1-P1). As shown by reference numbers 128A and 128B, the first network device and the second network device may respectively and symmetrically switch over to the next highest priority port on the first network device and the second network device (e.g., port P3 on the first network device and port P3 on the second network device). As shown by reference number 130, the second network device may receive a PTP packet (e.g., from the third network device), process the PTP packet (e.g., by including information identifying the amount of time the PTP packet spent at the second network device), and forward the PTP packet to the first network device on link P3-P3 based on switching over to the next highest priority port. At reference number 132, the first network device may receive the PTP packet at port P3 on the first network device.

Figure 1H:
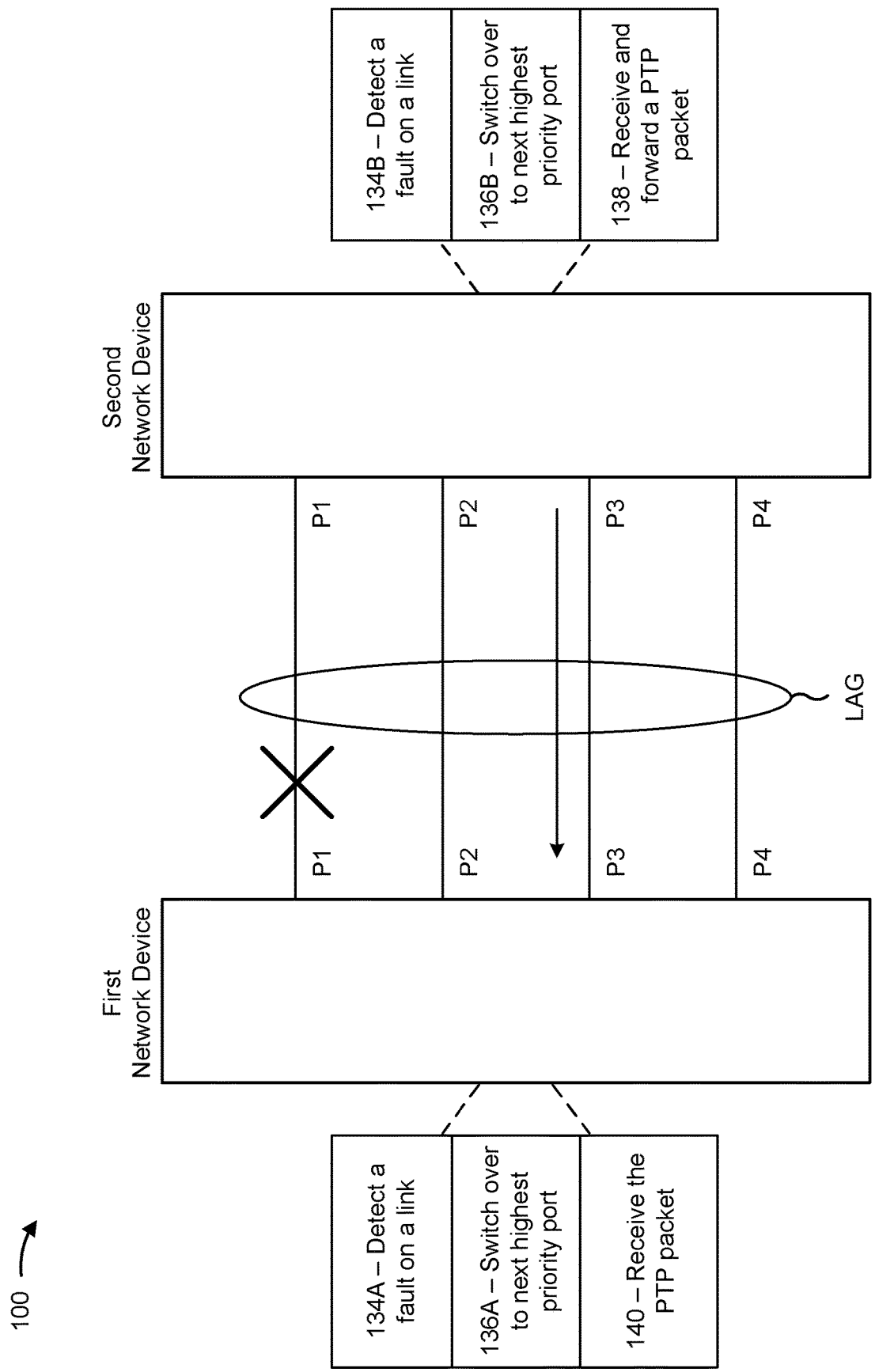

Another example of switchover synchronization is shown in FIG. 1H. In FIG. 1H, the second network device may be a PTP unaware node. That is, the second network device may be a device that is not configured for PTP communications, and therefore does not generate, terminate, or process PTP packets. The second network device in FIG. 1H may receive a PTP packet (e.g., form a third network device) and forward the PTP packet to the first network device.

In some implementations, the first network device and the second network device may configure PTP port priorities, as described above in connection with reference numbers 102-116. For example, the first network device may configure a respective port priority for each of ports P1-P4 on the first network device, transmit a respective LLDP frame from each of ports P1-P4, and the second network device may configure port priorities for ports P1-P4 on the second network device based on the received LLDP frames. In this way, even though the second network device is unaware of PTP, the first network device may still port priorities for forwarding PTP packets and for PTP communication switchover using another protocol understood by the second network device.

As shown by reference numbers 134A and 134B, the first network device and the second network device may each detect a fault on a link between the first network device and the second network device (e.g., link P1-P1). As shown by reference numbers 136A and 136B, the first network device and the second network device may respectively and symmetrically switch over to the next highest priority port on the first network device and the second network device (e.g., port P3 on the first network device and port P3 on the second network device). As shown by reference number 138, the second network device may receive a PTP packet (e.g., from the third network device) and forward the PTP packet to the first network device on link P3-P3 based on switching over to the next highest priority port. At reference number 140, the first network device may receive the PTP packet at port P3 on the first network device.

As indicated above, FIGS. 1A-1H are provided merely as an example. Other examples are possible and may differ from what was described with regard to FIGS. 1A-1H.

Figure 2A:
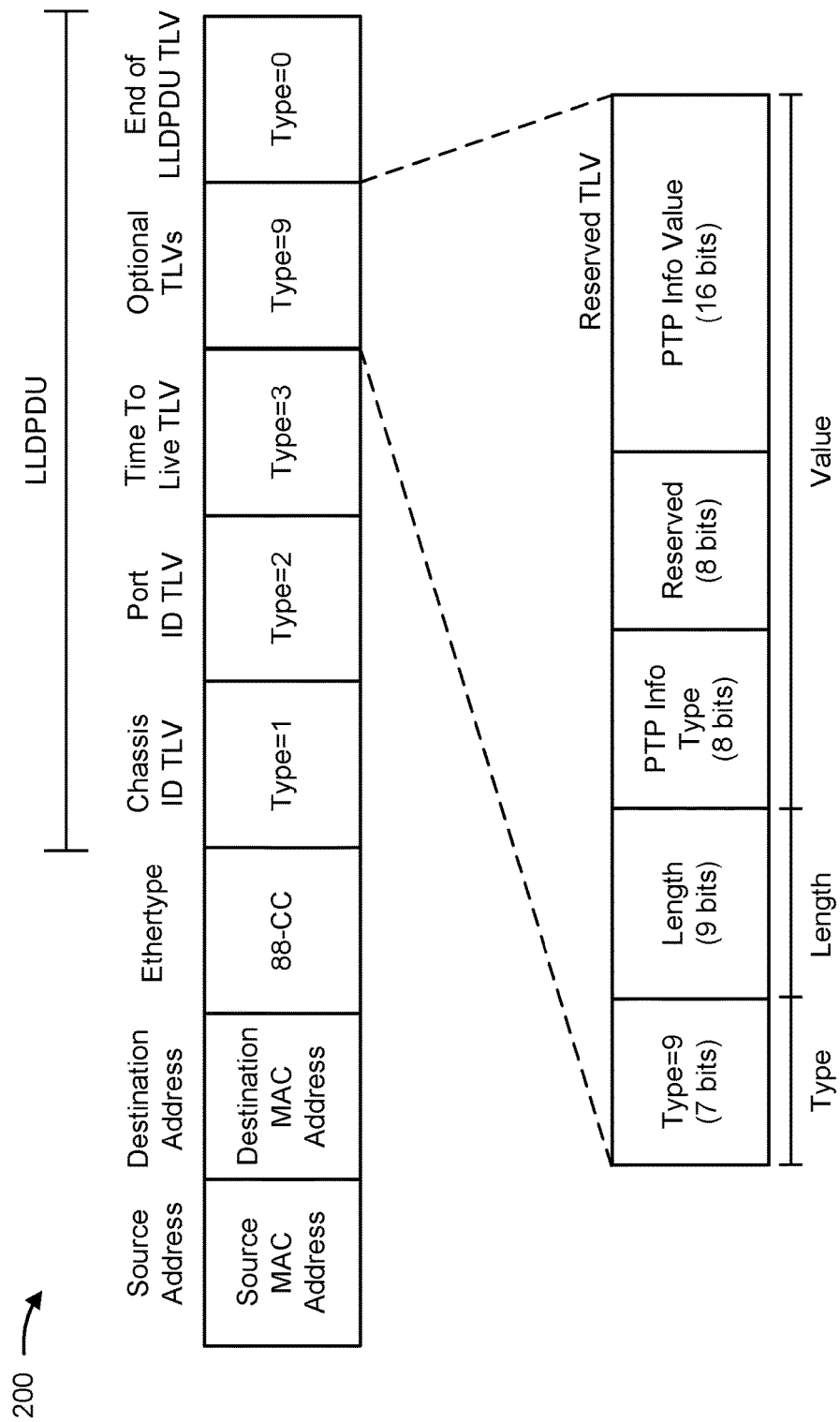
FIGS. 2A and 2B are examples of link layer discovery protocol (LLDP) frames.
Figure 2B:
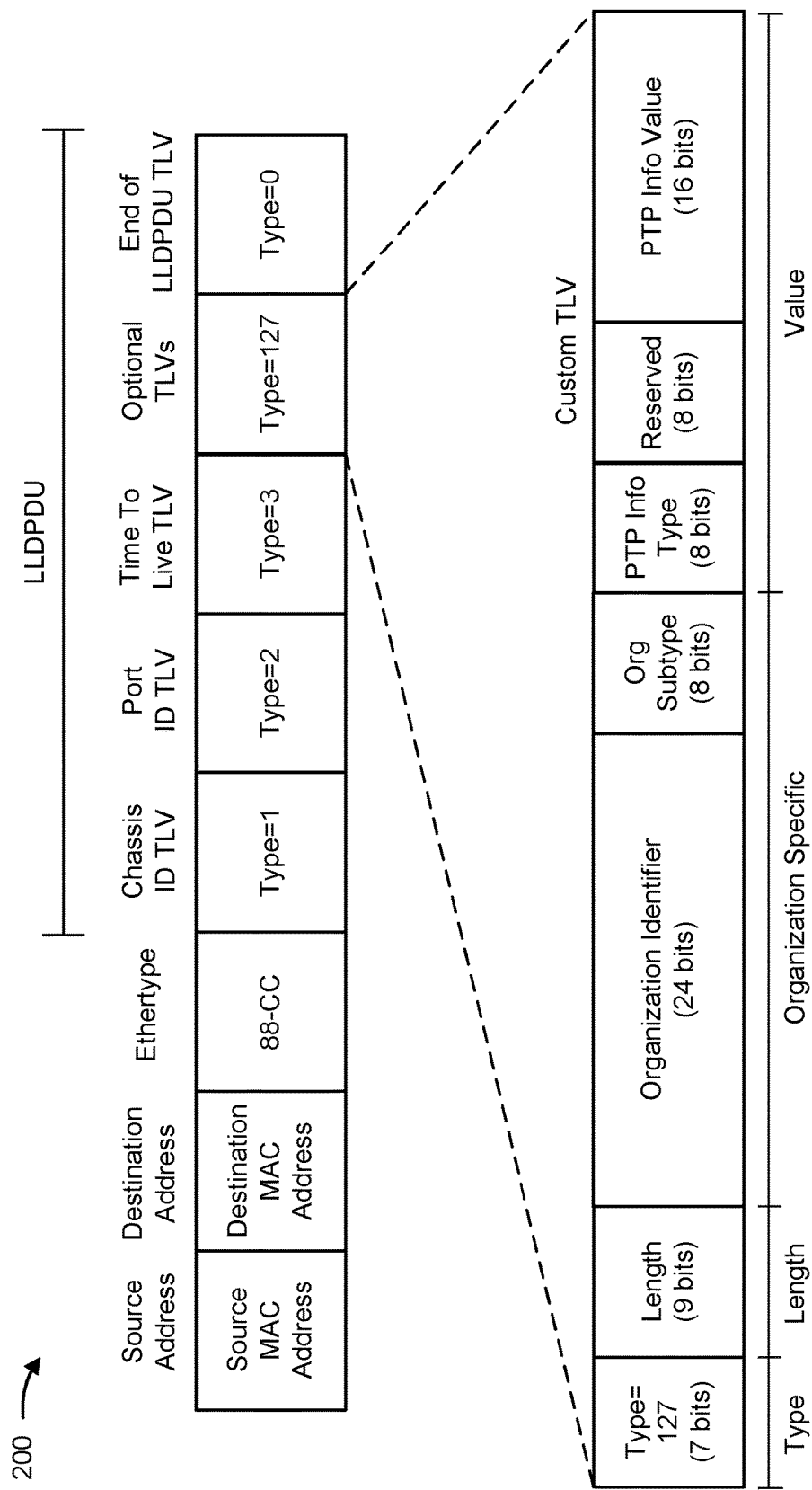

FIGS. 2A and 2B are diagrams of an example LLDP frame 200 described herein. Example LLDP frame 200 may be an example of a LLDP frame transmitted between the first network device and the second network device, as described above. As shown in FIGS. 2A and 2B, example LLDP frame 200 may include various fields, such as a source address field, a destination address field, an Ethertype field, a LLDP data unit (LLDPDU), and/or the like. The LLDPDU may include a plurality of TLV fields, such as a chassis identifier (ID) TLV field, a port ID TLV field, a time to live TLV field, one or more option TLV fields, and an end LLDPDU TLV field, and/or the like.

The source address field may include source address information, such as a source media access control (MAC) address, associated with a sender of LLDP frame 200 (e.g., the first network device, the second network device, and/or the like). The destination address field may include destination information, such as a destination MAC address, associated with a receiver of LLDP frame 200 (e.g., the first network device, the second network device, and/or the like). The Ethertype field may include information indicating a type of protocol associated with LLDP frame 200. Since LLDP frame 200 is a LLDP frame, the Ethertype field may be set to "88-CC", which is an Ethertype identifier associated with LLDP.

Each of the plurality of TLV fields included in the LLDPDU of LLDP frame 200 may be assigned a TLV type value. For example, TLV type 1 may be assigned to the chassis ID TLV field, TLV type 2 may be assigned to the port ID TLV field, TLV type 3 may be assigned to the time to live TLV field, TLV types 4-127 may be assigned to various optional TLV fields, TLV type 0 may be assigned to the end of LLDPDU TLV field, and/or the like. Within the optional TLV fields, TLV types 9-126 may be assigned to various reserved TLV fields, TLV type 127 may be assigned to a custom TLV field, and/or the like.

The chassis ID TLV field (TLV type 1) may include information identifying a network device associated with the sender of LLDP frame 200. For example, the information identifying the network device may include a chassis ID type (e.g., a device MAC address type, an Internet protocol (IP) address type, and/or the like) and a chassis ID value (e.g., a device MAC address associated with the network device, an IP address value associated with the network device, and/or the like). The port ID TLV field (TLV type 2) may include information identifying a port, on the network device associated with the sender, from which LLDP frame is transmitted. For example, the information identifying the port may include a port ID type (e.g., a port name type, a port MAC address type, and/or the like) and a port ID value (e.g., a port name associated with the port, a port MAC address associated with the port, and/or the like). The time to live TLV field (TLV type 3) may include information indicating an amount of time the information included in the LLDPDU of LLDP frame 200 will remain valid. The amount of time may be defined in nanoseconds, milliseconds, seconds, and/or the like. The end of LLDPDU TLV field (TLV type 0) may indicate the end of the LLDPDU.

As shown in FIGS. 2A and 2B, PTP information may be included in one or more of the optional TLV fields. In the example illustrated in FIG. 2A, the PTP information is included in a reserved TLV field (e.g., TLV type 9). The reserved TLV field may include 48 bits of information divided into three sub-fields: a type subfield, a length subfield, and a value subfield. The type subfield may include 7 bits of information identifying the TLV type (i.e., TLV type 9). The length subfield may include 9 bits of information identifying a length of the value subfield, which may be 32 bits in the example shown in FIG. 2A. The value subfield may include 32 bits of information identifying the PTP information included in LLDP frame 200.

The PTP information included in the value subfield may include 8 bits of information identifying a PTP information type, 8 bits of reserved space, and 16 bits of information identifying a PTP information value. As an example, the PTP information type may be type 1, indicating that the PTP information value is a port priority value, and the PTP information value may indicate the port priority value (e.g., port priority 1, port priority 2, etc.).

In the example shown in FIG. 2B, the PTP information is included in a custom TLV field (e.g., TLV type 127). The custom TLV field may include 80 bits or more of information divided into four sub-fields: a type subfield, a length subfield, an organization-specific subfield, and a value subfield. The type subfield may include 7 bits of information identifying the TLV type (i.e., TLV type 127). The length subfield may include 9 bits of information identifying a length of the value subfield, which may be 32 bits in the example shown in FIG. 2A. The organization-specific subfield may include 24 bits of information identifying an organization associated with the custom TLV field (e.g., an organization identifier) and 8 bits of information identifying an organization-specific subtype. In some implementations, an organization associated with the organization identifier may define an organization-specific subtype associated with PTP communications. The value subfield may include 32 bits of information identifying the PTP information included in LLDP frame 200.

The PTP information included in the value subfield may include 8 bits of information identifying a PTP information type, 8 bits of reserved space, and 16 bits of information identifying a PTP information value. As an example, the PTP information type may be type 1, indicating that the PTP information value is a port priority value, and the PTP information value may indicate the port priority value (e.g., port priority 1, port priority 2, etc.).

As indicated above, FIGS. 2A and 2B are provided merely as examples. Other examples are possible and may differ from what was described with regard to FIGS. 2A and 2B.

Figure 3:
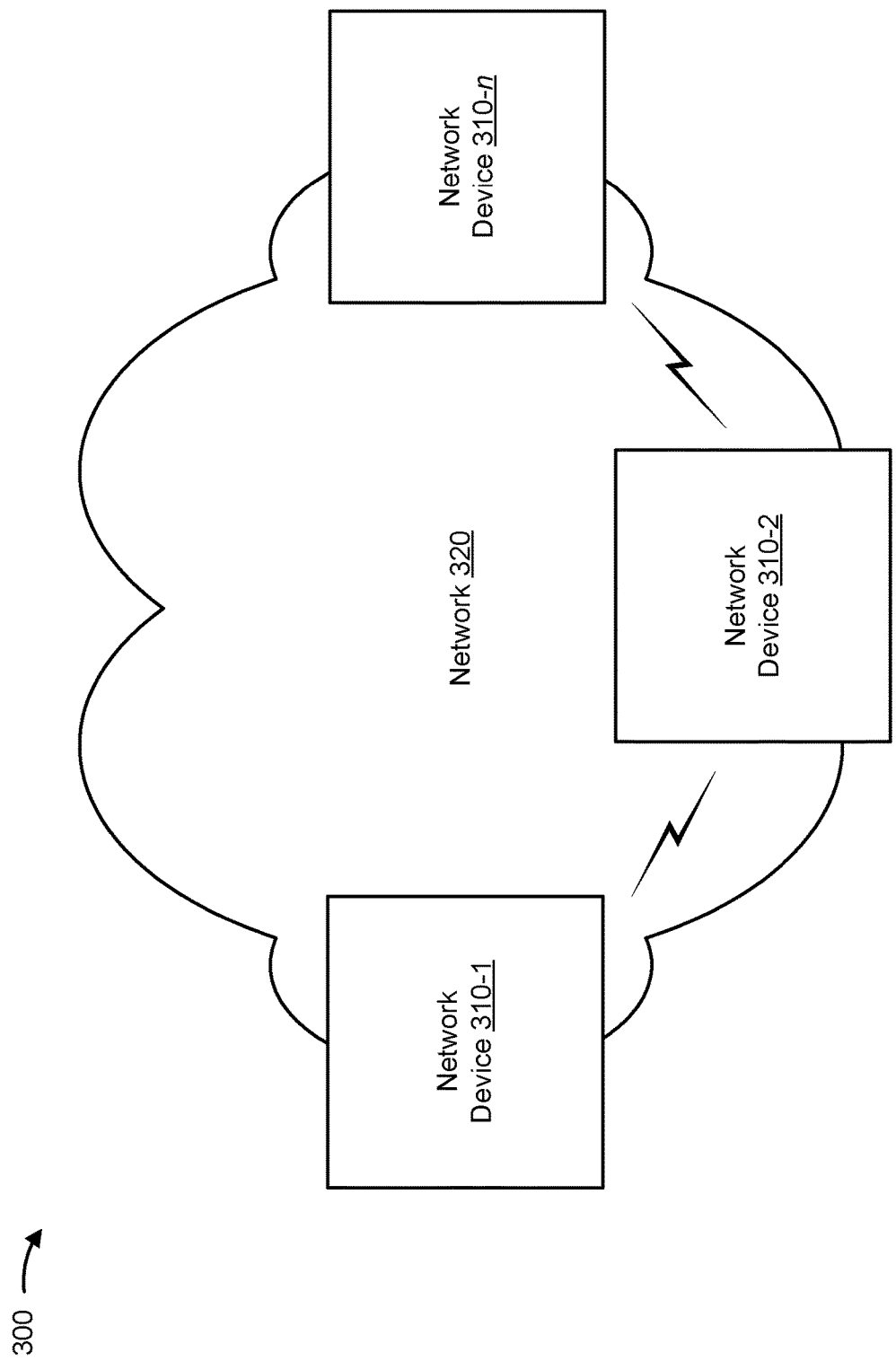
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include one or more network devices 310-1 through 310-$n$ ($n \geq 1$) (hereinafter referred to collectively as "network devices 310," and individually as "network device 310") and a network 320. Devices of environment 300 may interconnect via wired connections, wireless connections, or a combination of wired and wireless connections.

Network device 310 may include one or more devices capable of receiving, providing, storing, generating, and/or processing information. For example, network device 310 may be capable of performing PTP communications, transmitting and receiving LLDP frames, and/or the like to and from other network devices 310 and/or other devices in network 320, as described herein. As another example, network device 310 may be associated with a clock for synchronizing various portions of network 320. Accordingly, network device 310 may be associated with, or may be implemented by, a grandmaster clock, a boundary clock, an ordinary clock, a transparent clock, and/or the like.

In some implementations, network device 310 may include a firewall, a router, a gateway, a switch, a hub, a bridge, a wireless access point, a base station (e.g., eNodeB, NodeB, gNodeB, and/or the like), a grandmaster clock device, a boundary clock device, and/or the like. In some implementations, network device 310 may be implemented as a physical device implemented within a housing, such as a chassis. In some implementations, network device 310 may be implemented as a virtual device implemented by one or more computer devices of a cloud computing environment or a data center.

Network 320 includes one or more wired and/or wireless networks. For example, network 320 may include a cellular network (e.g., a long-term evolution (LTE) network, a code division multiple access (CDMA) network, a 3G network, a 4G network, a 5G network, another type of cellular network, etc.), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
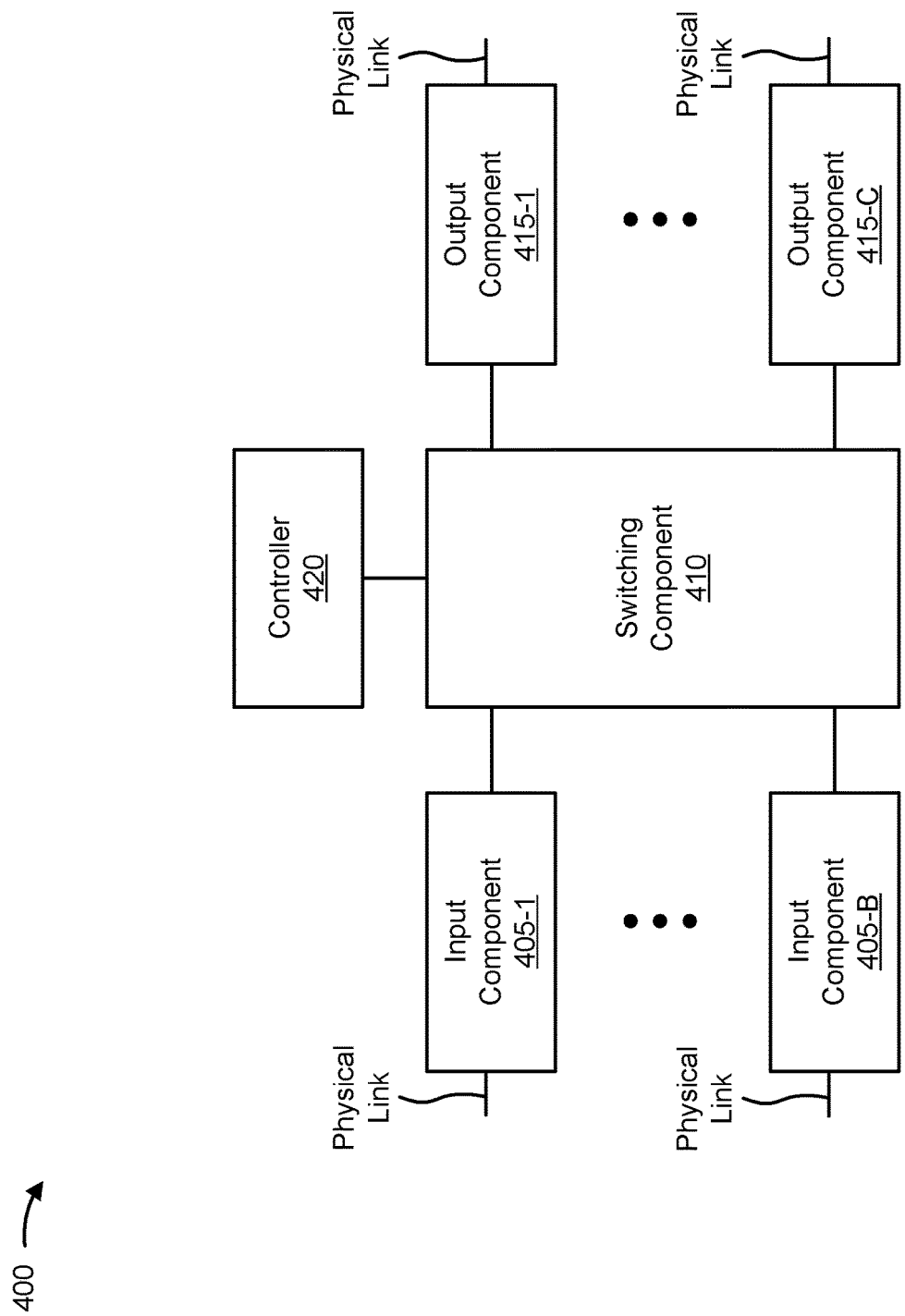
FIG. 4 is a diagram of example components of one or more devices of FIG. 3.

FIG. 4 is a diagram of example components of a device 400. Device 400 may correspond to one or more of network devices 310. In some implementations, one or more of network devices 310 may include one or more devices 400 and/or one or more components of device 400. As shown in FIG. 4, device 400 may include one or more input components 405-1 through 405-B (B≥1) (hereinafter referred to collectively as "input components 405," and individually as "input component 405"), a switching component 410, one or more output components 415-1 through 415-C (C≥1) (hereinafter referred to collectively as "output components 415," and individually as "output component 415"), and a controller 420.

Input component 405 may be points of attachment for physical links and may be points of entry for incoming traffic, such as packets. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 405.

Switching component 410 may interconnect input components 405 with output components 415. In some implementations, switching component 410 may be implemented via one or more crossbars, via busses, and/or with shared memories. The shared memories may act as temporary buffers to store packets from input components 405 before the packets are eventually scheduled for delivery to output components 415. In some implementations, switching component 410 may enable input components 405, output components 415, and/or controller 420 to communicate.

Output component 415 may store packets and may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 415. In some implementations, input component 405 and output component 415 may be implemented by the same set of components (e.g., an input/output component may be a combination of input component 405 and output component 415).

Controller 420 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 420 may include one or more processors that may be programmed to perform a function.

In some implementations, controller 420 may include a random access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create routing tables based on the network topology information, create forwarding tables based on the routing tables, and forward the forwarding tables to input components 405 and/or output components 415. Input components 405 and/or output components 415 may use the forwarding tables to perform route lookups for incoming and/or outgoing packets.

Controller 420 may perform one or more processes described herein. Controller 420 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 420 from another computer-readable medium or from another device via a communication interface. When executed, software instructions stored in a memory and/or storage component associated with controller 420 may cause controller 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
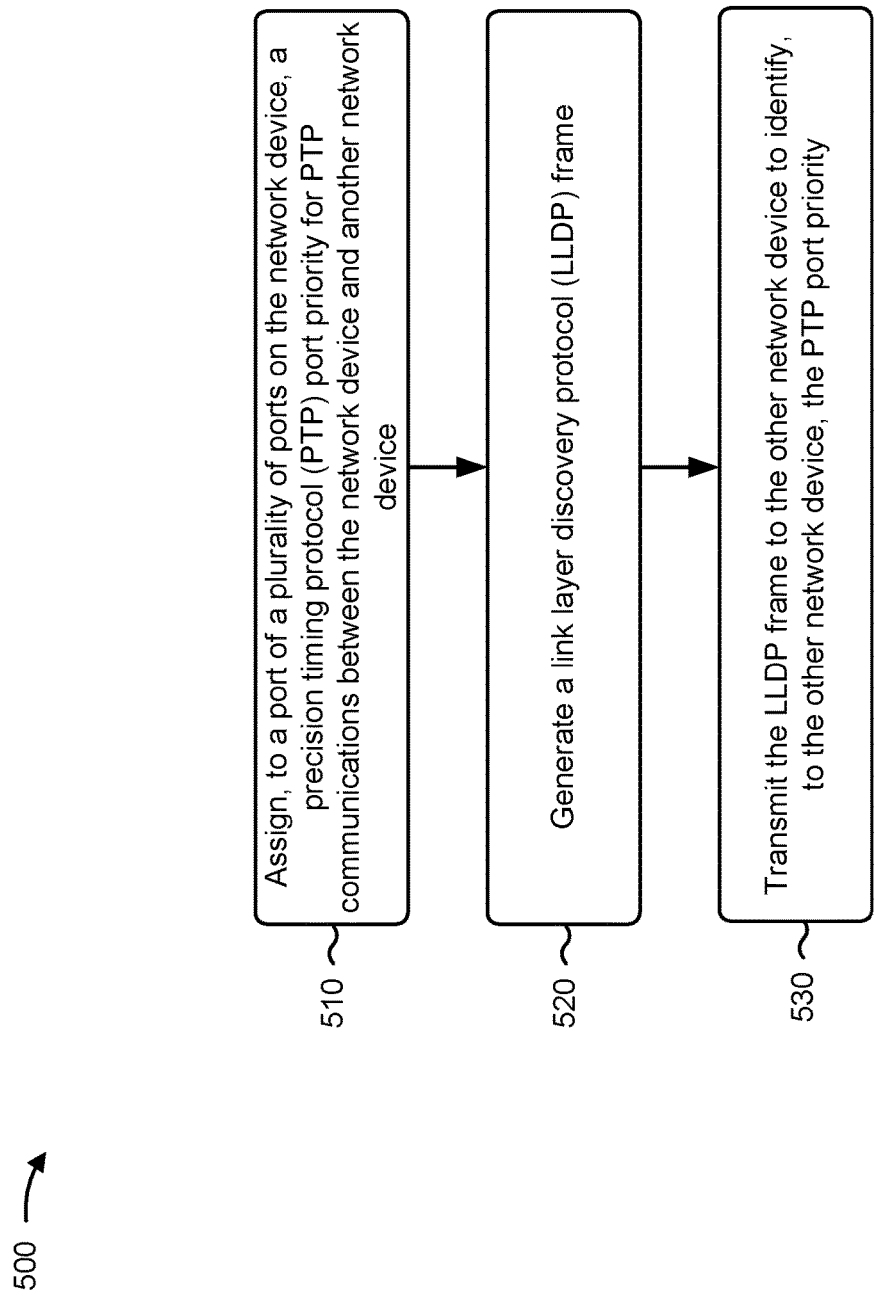
FIG. 5 is a flow chart of an example process for PTP configuration using LLDP.

FIG. 5 is a flow chart of an example process 500 for PTP configuration using LLDP. In some implementations, one or more process blocks of FIG. 5 may be performed by a network device (e.g., network device 310). In some implementations, one or more process blocks of FIG. 5 may be performed by a plurality of network devices 310.

As shown in FIG. 5, process 500 may include assigning, to a port of a plurality of ports on the network device, a PTP port priority for PTP communications between the network device and another network device (block 510). For example, the network device (e.g., using input component 405, output component 415, controller 420, and/or the like) may assign, to a port of a plurality of ports on the network device, a PTP port priority for PTP communications between the network device and another network device, as described above in connection with FIGS. 1A-1H. In some implementations, the network device and the other network device may be communicatively connected via a plurality of links in a LAG. In some implementations, each port, of the plurality of ports, may be associated with a respective link, of the plurality of links, in the LAG.

As shown in FIG. 5, process 500 may include generating a LLDP frame (block 520). For example, the network device (e.g., using input component 405, output component 415, controller 420, and/or the like) may generate a LLDP frame, as described above in connection with FIGS. 1A-1H. In some implementations, the LLDP frame may include information identifying the PTP port priority, assigned to the port, for the PTP communications between the network device and the other network device.

As shown in FIG. 5, process 500 may include transmitting the LLDP frame to the other network device to identify, to the other network device, the PTP port priority (block 530). For example, the network device (e.g., using output component 415, controller 420, and/or the like) may transmit the LLDP frame to the other network device to identify, to the other network device, the PTP port priority, as described above in connection with FIGS. 1A-1H.

Process 500 may include additional implementations, such as any single implementation or any combination of implementations described below and/or described with regard to any other process described herein.

In some implementations, when transmitting the LLDP frame to the other network device, the network device may transmit the LLDP frame to the other network device via the port and the respective link associated with the port. In some implementations, when assigning the PTP port priority to the port, the network device may assign a respective PTP port priority to each port of the plurality of ports on the network device.

In some implementations, when generating the LLDP frame, the network device may generate a respective LLDP frame for each port of the plurality of ports on the network device. In some implementations, when generating the LLDP frame, the network device may include the information identifying the PTP port priority, assigned to the port, in a TLV field in the LLDP frame. In some implementations, a type of the TLV field may be at least one of a reserved type or a custom type.

In some implementations, the port may be first port, the plurality of ports may be a first plurality of ports, the PTP port priority may be a first PTP port priority, and the LLDP frame may be a first LLDP frame, and the network device may assign, to a second port of a second plurality of ports on the network device, a second PTP port priority for PTP communications between the network device and a further network device, generate a second LLDP frame, the second LLDP frame including information identifying the second PTP port priority assigned to the second port, and transmit the second LLDP frame to the further network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
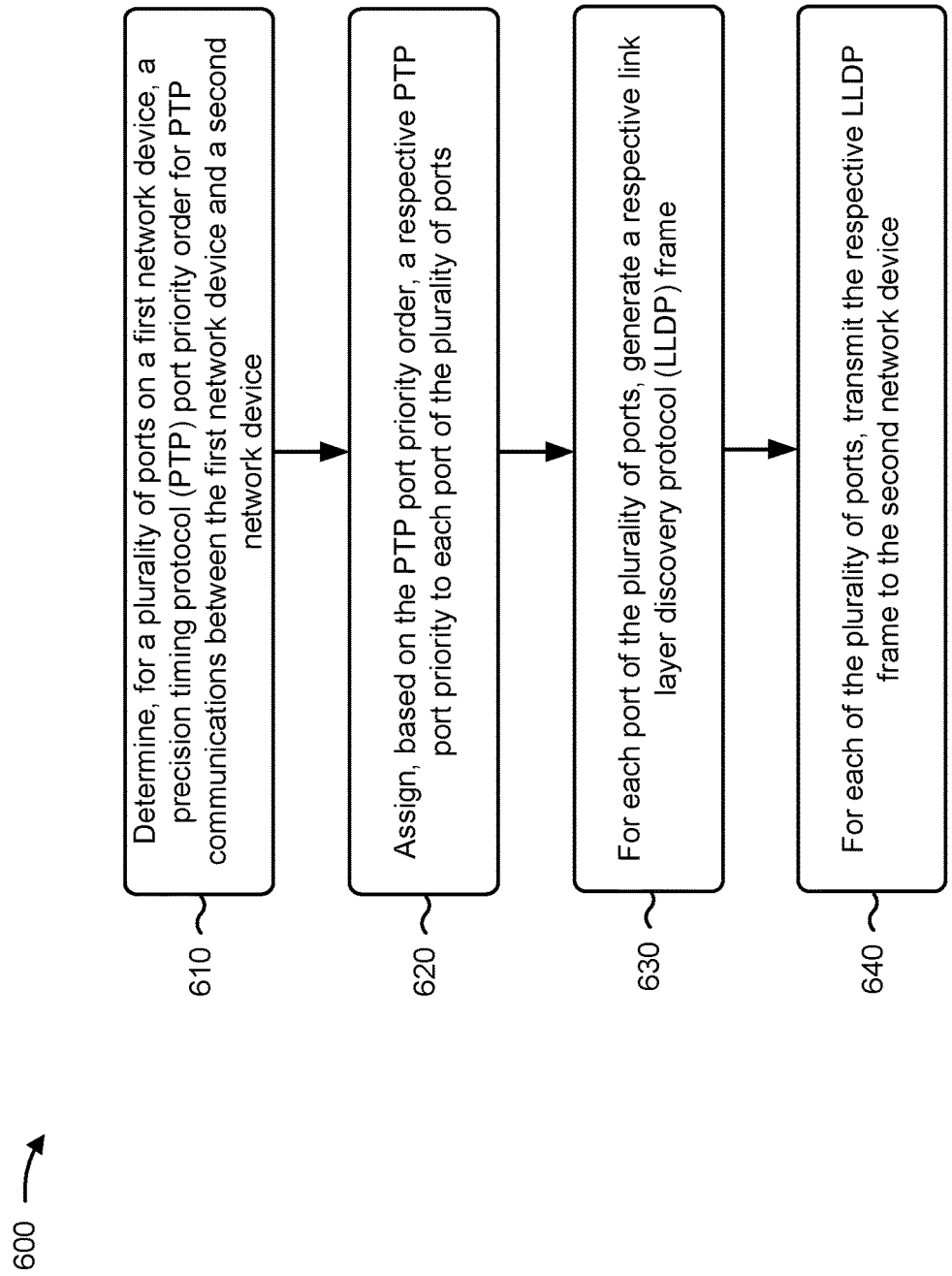
FIG. 6 is a flow chart of an example process for PTP configuration using LLDP.

FIG. 6 is a flow chart of an example process 600 for PTP configuration using LLDP. In some implementations, one or more process blocks of FIG. 6 may be performed by a first network device (e.g., network device 310). In some implementations, one or more process blocks of FIG. 6 may be performed by a plurality of network devices 310.

As shown in FIG. 6, process 600 may include determining, for a plurality of ports on the first network device, a PTP port priority order for PTP communications between the first network device and a second network device (block 610). For example, the first network device (e.g., using input component 405, output component 415, controller 420, and/or the like) may determine, for a plurality of ports on the first network device, a PTP port priority order for PTP communications between the first network device and the second network device, as described above in connection with FIGS. 1A-1H. In some implementations, the first network device and the second network device may be communicatively connected via a plurality of links in a LAG. In some implementations, each port, of the plurality of ports, may be associated with a respective link, of the plurality of links, in the LAG.

As shown in FIG. 6, process 600 may include assigning, based on the PTP port priority order, a respective PTP port priority to each port of the plurality of ports (block 620). For example, the first network device (e.g., using input component 405, output component 415, controller 420, and/or the like) may assign, based on the PTP port priority order, a respective PTP port priority to each port of the plurality of ports, as described above in connection with FIGS. 1A-1H.

As shown in FIG. 6, process 600 may include, for each port of the plurality of ports, generating a respective LLDP frame (block 630). For example, the first network device (e.g., using input component 405, output component 415, controller 420, and/or the like) may, for each port of the plurality of ports, generate a respective LLDP frame, as described above in connection with FIGS. 1A-1H. In some implementations, the respective LLDP frame, for a port of the plurality of ports, may include information identifying the respective PTP port priority assigned to the port.

As shown in FIG. 6, process 600 may include, for each port of the plurality of ports, transmitting the respective LLDP frame to the second network device (block 640). For example, the first network device (e.g., using output component 415, controller 420, and/or the like) may, for each port of the plurality of ports, transmit the respective LLDP frame to the second network device, as described above in connection with FIGS. 1A-1H.

Process 600 may include additional implementations, such as any single implementation or any combination of implementations described below and/or described with regard to any other process described herein.

In some implementations, the PTP port priority order may define an order in which the plurality of ports may be used for the PTP communications between the first network device and the second network device. In some implementations, when assigning the respective PTP port priority to each port of the plurality of ports, the first network device may assign a first PTP port priority to a first port of the plurality of ports and assign a second PTP port priority to a second port of the plurality of ports, wherein the first PTP port priority is a higher priority relative to the second PTP port priority.

In some implementations, the first network device may perform, based on the first PTP port priority, the PTP communications between the first network device and the second network device using the first port, detect a fault on the respective link associated with the first port, and perform, based on the second PTP port priority and based on detecting the fault, the PTP communications between the first network device and the second network device using the second port.

In some implementations, when determining the PTP port priority order, the first network device may determine the PTP port priority order based on at least one of a respective bandwidth associated with each link of the plurality of links, a respective latency associated with each link of the plurality of links, or a respective port identifier associated with each link of the plurality of links.

In some implementations, the first network device may be associated with at least one of a first PTP boundary clock or a first PTP ordinary clock, and the second network device may be associated with at least one of a second PTP boundary clock, a second PTP ordinary clock, or a PTP transparent clock.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
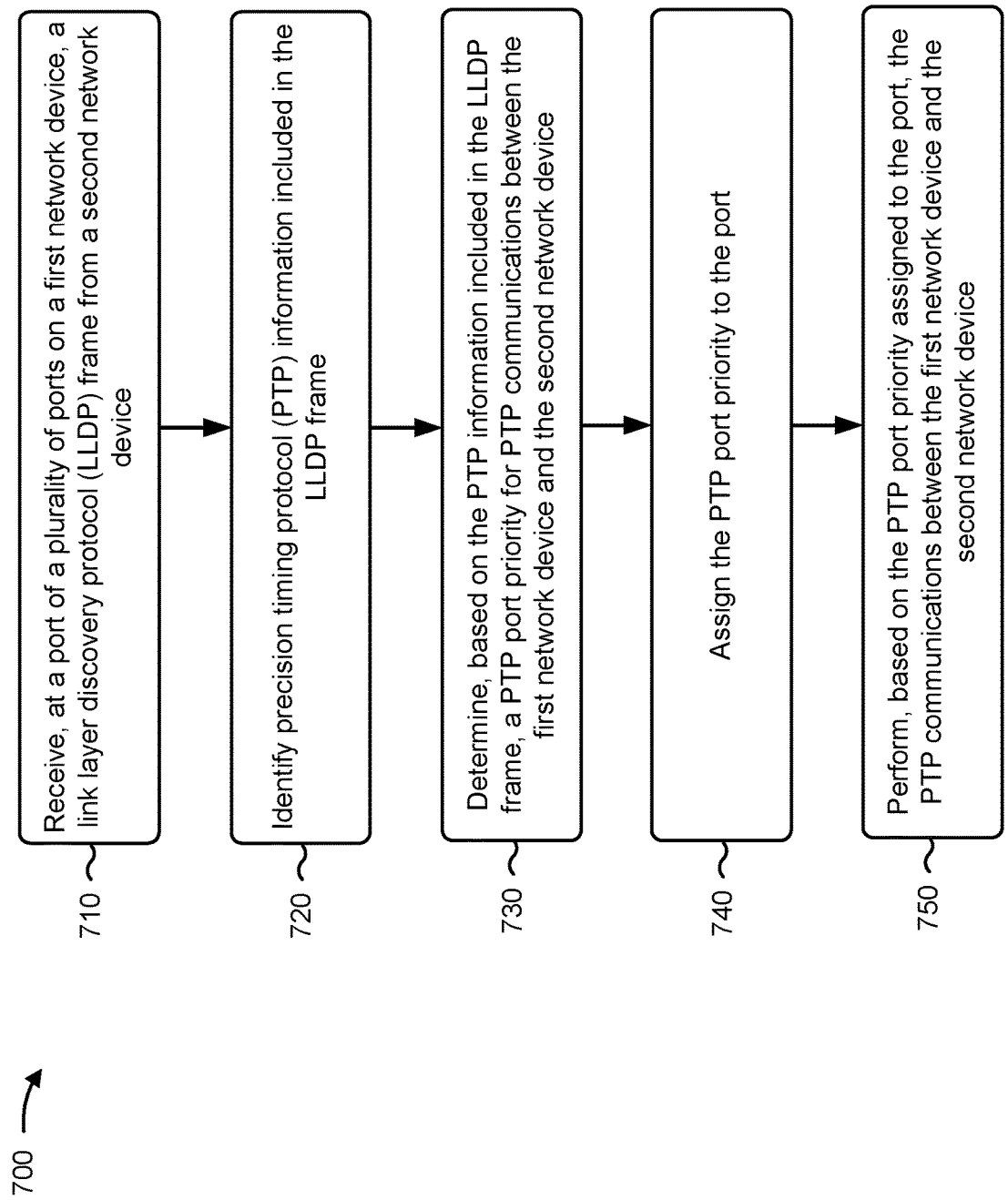
FIG. 7 is a flow chart of an example process for PTP configuration using LLDP.

FIG. 7 is a flow chart of an example process 700 for PTP configuration using LLDP. In some implementations, one or more process blocks of FIG. 7 may be performed by a first network device (e.g., network device 310). In some implementations, one or more process blocks of FIG. 7 may be performed by a plurality of network devices 310.

As shown in FIG. 7, process 700 may include receiving, at a port of a plurality of ports on the first network device, a LLDP frame from a second network device (block 710). For example, the first network device (e.g., using input component 405, controller 420, and/or the like) may receive, at a port of a plurality of ports on first network device, a LLDP frame from the second network device, as described above in connection with FIGS. 1A-1H. In some implementations, the first network device and the second network device may be communicatively connected via a plurality of links in a LAG. In some implementations, the port may be associated with a link of the plurality links in the LAG.

As shown in FIG. 7, process 700 may include identifying PTP information included in the LLDP frame (block 720). For example, the first network device (e.g., using input component 405, output component 415, controller 420, and/or the like) may identify PTP information included in the LLDP frame, as described above in connection with FIGS. 1A-1H.

As shown in FIG. 7, process 700 may include determining, based on the PTP information included in the LLDP frame, a PTP port priority for PTP communications between the first network device and the second network device (block 730). For example, the first network device (e.g., using input component 405, output component 415, controller 420, and/or the like) may determine, based on the PTP information included in the LLDP frame, a PTP port priority for PTP communications between the first network device and the second network device, as described above in connection with FIGS. 1A-1H.

As shown in FIG. 7, process 700 may include assigning the PTP port priority to the port (block 740). For example, the first network device (e.g., using input component 405, output component 415, controller 420, and/or the like) may assign the PTP port priority to the port, as described above in connection with FIGS. 1A-1H.

As shown in FIG. 7, process 700 may include performing, based on the PTP port priority assigned to the port, the PTP communications between the first network device and the second network device (block 750). For example, the first network device (e.g., input component 405, output component 415, controller 420, and/or the like) may perform, based on the PTP port priority assigned to the port, the PTP communications between the first network device and the second network device, as described above in connection with FIGS. 1A-1H.

Process 700 may include additional implementations, such as any single implementation or any combination of implementations described below and/or described with regard to any other process described herein.

In some implementations, the PTP information included in the LLDP frame may include a PTP information type identifier and a PTP priority identifier. In some implementations, when determining the PTP port priority, the first network device may determine the PTP port priority based on the PTP information type identifier and the PTP priority identifier. In some implementations, the port may be first port, the PTP port priority may be a first PTP port priority, and the PTP priority identifier may correspond to a PTP second port priority assigned to a second port on the second network device.

In some implementations, the port may be a first port, and, when performing the PTP communications between the first network device and the second network device based on the PTP port priority assigned to the first port, the first network device may perform the PTP communications between the first network device and the second network device via a second port, of the plurality of ports, on the first network device.

In some implementations, the port may be a first port, and the first network device may detect a fault in a second link, of the plurality of links in the LAG, associated with the second port, and perform, based on detecting the fault and based on the PTP port priority assigned to the first port, the PTP communications between the first network device and the second network device via the first port.

In some implementations, when identifying the PTP information included in the LLDP frame, the first network device may identify the PTP information in a TLV field in the LLDP frame, wherein a type of the TLV field may include at least one of a reserved type or a custom type.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more memories; and
one or more processors to:
receive a link layer discovery protocol (LLDP) frame for a port, of a plurality of ports, on the network device,
wherein the network device and another network device are communicatively connected via a plurality of links in a link aggregation group (LAG), and
wherein the port, of the plurality of ports on the network device, is associated with a link, of the plurality of links, in the LAG;
identify precision timing protocol (PTP) information for the port based on the LLDP frame, wherein the LLDP frame includes the PTP information;
determine a port priority for the port for PTP communications between the network device and the other network device based on the PTP information;
assign the port priority for the port; and
perform the PTP communications based on the assigned port priority.

2. The network device of claim 1, wherein the one or more processors are further to:
detect a fault on the link;
switch over to a next priority port; and
perform the PTP communications.

3. The network device of claim 1, wherein the network device is associated with a transparent clock, and
wherein the one or more processors are further to:
detect a fault on the link;
switch over to a next highest priority port;
receive a PTP packet;
process the PTP packet; and
forward the PTP packet to the other network device based on switching over to the next highest priority port.

4. The network device of claim 1, wherein the LLDP frame includes one or more of:
information associated with an identity of the other network device,
one or more capabilities of the other network device, or
one or more configurations of the other network device.

5. The network device of claim 1, wherein a clock associated with the network device is selected as a slave and another clock associated with the other network device is selected as a master, and
wherein the clock associated with the network device synchronizes to the other clock associated with the other network device.

6. The network device of claim 1, wherein the one or more processors, when determining the port priority for the port for the PTP communications, are to:
determine the port priority for the port on the network device based on port priorities assigned to a plurality of ports on the other network device to ensure symmetric PTP communications.

7. The network device of claim 1, wherein the LLDP frame for the port includes a destination address field including information associated with an address of the network device.

8. A non-transitory computer-readable medium storing instructions, the instructions comprising:
one or more instructions that, when executed by one or more processors on a network device, cause the one or more processors to:
receive a link layer discovery protocol (LLDP) frame for a port, of a plurality of ports, on the network device,
wherein the network device and another network device are communicatively connected via a plurality of links in a link aggregation group (LAG);
identify precision timing protocol (PTP) information for the port based on the LLDP frame,
wherein the LLDP frame includes the PTP information;
determine a port priority for the port for PTP communications between the network device and the other network device based on the PTP information;
assign the port priority for the port; and
perform the PTP communications based on the assigned port priority.

9. The non-transitory computer-readable medium of claim 8, wherein the port, of the plurality of ports on the network device, is associated with a link, of the plurality of links, in the LAG, and
wherein the one or more instructions, when executed by the one or more processors, further cause the one or more processors to:
detect a fault on the link;
switch over to next priority port; and
perform the PTP communications.

10. The non-transitory computer-readable medium of claim 8, wherein the network device is associated with a transparent clock,
wherein the port, of the plurality of ports on the network device, is associated with a link, of the plurality of links, in the LAG, and
wherein the one or more instructions, when executed by the one or more processors, further cause the one or more processors to:
detect a fault on the link;
switch over to next highest priority port;
receive a PTP packet;
process the PTP packet; and
forward the PTP packet to the other network device based on switching over to the next highest priority port.

11. The non-transitory computer-readable medium of claim 8, wherein the LLDP frame includes one or more of:
information associated with an identity of the other network device,
one or more capabilities of the other network device, or
one or more configurations of the other network device.

12. The non-transitory computer-readable medium of claim 8, wherein a clock associated with the network device is selected as a slave and another clock associated with the other network device is selected as a master, and
wherein the clock associated with the network device synchronizes to the other clock associated with the other network device.

13. The non-transitory computer-readable medium of claim 8, wherein the one or more instructions, that cause the one or more processors to determine the port priority for the port for the PTP communications, cause the one or more processors to:
determine the port priority for the port on the network device based on port priorities assigned to a plurality of ports on the other network device to ensure symmetric PTP communications.

14. The non-transitory computer-readable medium of claim 8, wherein the LLDP frame for the port includes a destination address field including information associated with an address of the network device.

15. A method comprising:
receiving, by a network device, via precision timing protocol (PTP) communications between the network device and another network device, a link layer discovery protocol (LLDP) frame for a port, of a plurality of ports, on the network device,
wherein the network device and the other network device are communicatively connected, and
wherein the port, of the plurality of ports on the network device, is associated with a link, of a plurality of links;
identifying, by the network device, PTP information for the port based on the LLDP frame, wherein the LLDP frame includes the PTP information;

determining, by the network device, a port priority for the port for PTP communications between the network device and the other network device based on the PTP information;

assigning, by the network device, the port priority for the port; and performing, by the network device, the PTP communications based on the assigned port priority.

16. The method of claim 15, further comprising:

detecting a fault on the link;

switching over to next priority port; and performing the PTP communications.

17. The method of claim 15, wherein the network device is associated with a transparent clock, and wherein the method further comprises:

detecting a fault on the link;

switching over to next highest priority port;

receiving a PTP packet;

processing the PTP packet; and forwarding the PTP packet to the other network device based on switching over to the next highest priority port.

18. The method of claim 15, wherein a clock associated with the network device is selected as a slave and another clock associated with the other network device is selected as a master, and wherein the clock associated with the network device synchronizes to the other clock associated with the other network device.

19. The method of claim 15, where determining the port priority for the port for the PTP communications comprises:

determining the port priority for the port on the network device based on port priorities assigned to a plurality of ports on the other network device to ensure symmetric PTP communications.

20. The method of claim 15, wherein the LLDP frame for the port includes a destination address field including information associated with an address of the network device.

* * * * *